(12) United States Patent
Nagaishi et al.

(10) Patent No.: US 7,062,487 B1
(45) Date of Patent: Jun. 13, 2006

(54) INFORMATION CATEGORIZING METHOD AND APPARATUS, AND A PROGRAM FOR IMPLEMENTING THE METHOD

(75) Inventors: Michihiro Nagaishi, Nagano-ken (JP); Shinji Miwa, Nirasaki (JP)

(73) Assignee: Seiko Epson Corporation, Tokyo (JP)

( * ) Notice: Subject to any disclaimer, the term of this patent is extended or adjusted under 35 U.S.C. 154(b) by 225 days.

(21) Appl. No.: 09/762,127

(22) PCT Filed: Jun. 2, 2000

(86) PCT No.: PCT/JP00/03623

§ 371 (c)(1),
(2), (4) Date: Feb. 2, 2001

(87) PCT Pub. No.: WO00/75809

PCT Pub. Date: Dec. 14, 2000

(30) Foreign Application Priority Data

Jun. 4, 1999 (JP) .................................. 11-158497
Jun. 17, 1999 (JP) .................................. 11-171723
Jul. 7, 1999 (JP) .................................. 11-193141

(51) Int. Cl.
*G06F 17/30* (2006.01)
(52) U.S. Cl. .............................................. 707/6; 707/3
(58) Field of Classification Search .................. 707/2, 707/3, 6, 7, 10, 5, 102, 104.1
See application file for complete search history.

(56) References Cited

U.S. PATENT DOCUMENTS

| | | | | |
|---|---|---|---|---|
| 5,634,051 A | * | 5/1997 | Thomson ........................ | 707/5 |
| 5,857,179 A | * | 1/1999 | Vaithyanathan et al. ....... | 707/2 |
| 5,864,845 A | | 1/1999 | Voorhees et al. | |
| 5,864,855 A | * | 1/1999 | Ruocco et al. ................. | 707/10 |
| 5,926,812 A | * | 7/1999 | Hilsenrath et al. ............. | 707/5 |
| 5,999,927 A | * | 12/1999 | Tukey et al. .................... | 707/5 |
| 6,094,653 A | * | 7/2000 | Li et al. ......................... | 707/6 |
| 6,167,397 A | * | 12/2000 | Jacobson et al. ............... | 707/5 |
| 6,178,419 B1 | * | 1/2001 | Legh-Smith et al. ........... | 707/6 |
| 6,385,602 B1 | * | 5/2002 | Tso et al. ........................ | 707/3 |
| 6,415,282 B1 | * | 7/2002 | Mukherjea et al. ............ | 707/3 |
| 6,519,585 B1 | * | 2/2003 | Kohli ............................. | 707/3 |

FOREIGN PATENT DOCUMENTS

| | | |
|---|---|---|
| JP | 7-319905 | 12/1995 |
| JP | 10-74206 | 3/1998 |
| JP | 11-149479 | 6/1999 |

(Continued)

OTHER PUBLICATIONS

Oren Zamir, Oren Etzioni, "Grouper: a dynamic clustering interface to Web search results", Computer Networks, vol. 31, No. 1 16, pp. 1361-1374, May 17, 1999.*

(Continued)

*Primary Examiner*—Leslie Wong
(74) *Attorney, Agent, or Firm*—Michael T. Gabrik

(57) ABSTRACT

When a general-purpose search service is used, a number of pieces of information searched according to a keyword input by a user is merely displayed. If there are a number of search results, it is difficult to learn the content of the search result. A clustering module acquires a plurality of search results searched by a general-purpose search service, performs a clustering process to the search results, and displays the clustering result. Also arranged is a converter module which converts the search result provided by the search service into a format that is processed by the clustering module.

60 Claims, 17 Drawing Sheets

FOREIGN PATENT DOCUMENTS

JP          11149479 A  *  6/1999

OTHER PUBLICATIONS

Oren Zamir, Oren Etzioni; "Grouper: a dynamic clustering interface to Web search results", Computer Networks, vol. 31, No. 1 16, pp. 1361-1374, May 17, 1999.*

Oren Zamir, Oren Etzioni, "Grouper: a dynamic clustering interface to Web search results", Computer Networks, vol. 31, No. 11-16, pp. 1361-1374, May 17, 1999.*

Oren Zamir, Oren Etzioni, "Grouper: a dynamic clustering interface to Web search results," Computer Networks, vol. 31, No. 11-16, pp. 1361-1374, May 17, 1999.

Daniel Dreilinger, Adele E. Howe, "Experiences with Selecting Search Engines Using Metasearch," ACM Transaction Information Systems, vol. 15, No. 3, pp. 195-222 Jul. 1997 Full text.

Iwadera, et al., "Tagengo Bunsan Joho Kensaku Architecture ni kansuru Kentou", Research Report of Information Processing Society of Japan (IPSJ), vol. 98, No. 82 (98-NL-127), pp. 63-70 (Japan) Sep. 17, 1998 Full text.

Shimamura et al., "WWW Document Kensaku ni okeru Domain Mei Clustering no Riyou", Research Report of Information Processing Society of Japan (IPSJ), vol. 98, No. 22 (98-HI-77), pp. 7-12 (Japan) Mar. 13, 1998 Full text.

Kawamae, et al., "Meta Kensaku System Kouchiku no tame no Data no Kouzouka ni kansuru Kenkyu", Workshop materials of the 38th Jinko Chino Kiso Kenkyukai and the 45th Chishiki Base System Kenkyukai pp. 37-42 (STG-FAI/KBS-9902-7), (Japan) Sep. 29, 1999 Full text.

Mukherjea, Sougata et al., "Using Clustering and Visualization for Refining the Results of a WWW Image Search Engine", XP002284975, 1998, pp. 29-35.

Chang C. H., et al., "Customizable Multi-Engine Search Tool with Clustering", Computer Networks and ISDN Systems, vol. 29, No. 8-13, Sep. 1, 1997, pp. 1217-1224.

Park, J. M., "Intelligent Query and Browsing Information Retrieval (IQBIR) Agent", proceedings of the 1998 *IEEE* International Conference, May 12, 1998, pp. 1173-1176.

"Internet Search Engine", 1998, pp. 648-650, with partial translation.

Information processing 9, 1998, pp. 861-865, with partial translation.

"Document Processing Utilities to Support Document Utilization Cycle Based on Natural Language Processing Technology", 1998, pp. 434-438, with partial translation.

* cited by examiner

FIG. 2

T1 — *SHEET CASSETTE
A1 — A STANDARD-SUPPLY UNIVERSAL SHEET CASSETTE CAN BE INTERCHANGED WITH AN OPTIONAL HIGH-VOLUME A4 SHEET CASSETTE. A STANDARD TRAY CONTAINS UP TO A STACK OF 200 SHEETS...  D1

T2 — *MOUNTING OF EXPANSION MEMORY TO A LASER PRINTER
A2 — A MEMORY EXPANSION OF A LASER PRINTER QUICKLY RELEASES A PERSONAL COMPUTER, ENABLES ... HOWEVER, WHAT DEGREE OF...  D2

T3 — *MOUNTING OF AN OPTIONAL INTERFACE CARD
A3 — A PRINTER IS DIRECTLY CONNECTED TO A NETWORK USING AN OPTIONAL INTERFACE CARD. AND...  D3

T4 — *SELECTION OF "TRAY", "CASSETTE", OR "AUTO" IN THE SETTING OF PRINTING SHEETS
A4 — THE SETTING OF A PAPER SHEET FEEDER AND SHEET SIZE IS REQUIRED TO PRINT THE SHEETS FROM A VARIETY OF APPLICATION SOFTWARE PROGRAMS. A SHEET GUIDE CLIP IN THE SHEET CASSETTE ...  D4

T5 — *MOUNTING OF A HARD DISK FOR ADDING FONTS TO THE PRINTER
A5 — TO ADD FONTS, A METHOD FOR ... IS AVAILABLE. WHEN AN OPTIONAL FONT ROM BOARD IS MOUNTED, IT IS POSSIBLE TO ...  D5

T6 — *SMEARING OF PRINTING SHEET THROUGH PRINTING
A6 — THE FIXING ROLLER IN THE PRINTER IS CLEANED WHEN THE EDGE OR THE BACK SIDE OF A SHEET IS SMEARED BLACK. A "CLEANING PRINTING" IS SET FROM A PANEL ON THE PRINTER MAIN UNIT TO PRINT AN A4 CLEANING SHEET. NEXT,...  D6

T7 — *MOUNTING OF SHEET CASSETTE
A7 — UP TO TWO UNITS OF OPTIONAL DOUBLE-CASSETTE UNITS OR A HIGH-VOLUME A4 SHEET CASSETTES, OR ONE OPTIONAL DOUBLE-CASSETTE UNIT AND ONE HIGH-VOLUME A4 SHEET CASSETTE ARE MOUNTABLE.  D7

FIG. 5

| FEATURE | DOCUMENT D1 | DOCUMENT D2 | DOCUMENT D3 | DOCUMENT D4 | DOCUMENT D5 | DOCUMENT D6 | DOCUMENT D7 |
|---|---|---|---|---|---|---|---|
| SHEET | 1 | | | 1 | | 1 | 1 |
| CASSETTE | 1 | 1 | 1 | 1 | | | 1 |
| MOUNTING | | | | | 1 | | 1 |

FIG. 6

| FEATURE | CLUSTER |
|---|---|
| SHEET | D1, D4, D6, D7 |
| CASSETTE | D1, D4, D7 |
| MOUNTING | D2, D3, D5, D7 |

FIG. 7

| FEATURE | TITLE |
|---|---|
| SHEET | *SHEET CASSETTE<br>*SELECTION OF "TRAY", "CASSETTE", OR "AUTO" IN THE SETTING OF PRINTING SHEETS<br>*SMEARING OF PRINTING SHEET THROUGH PRINTING<br>*MOUNTING OF SHEET CASSETTE |
| CASSETTE | *SHEET CASSETTE<br>*SELECTION OF "TRAY", "CASSETTE", OR "AUTO" IN THE SETTING OF PRINTING SHEETS<br>*MOUNTING OF SHEET CASSETTE |
| MOUNTING | *MOUNTING OF EXPANSION MEMORY TO THE LASER PRINTER<br>*MOUNTING OF AN OPTIONAL INTERFACE CARD<br>*MOUNTING OF A HARD DISK FOR ADDING FONTS TO THE PRINTER<br>*MOUNTING OF SHEET CASSETTE |

FIG. 11

| CLUSTER NAME | NO. OF DOCUMENTS / SCORE | TITLE OF DOCUMENT / SEARCH RESULT |
|---|---|---|
| SUMMARY | 16 | 133 INTRODUCTION OF EPSON TOHOKU<br>49 BASIC SPECIFICATIONS OF LP-7000<br>38 BASIC SPECIFICATIONS OF LP-8000<br>38 BASIC SPECIFICATIONS OF LP-8400<br>34 BASIC SPECIFICATIONS OF LP-700<br>33 INTRODUCTION OF SEIKO EPSON CO.<br>30 BASIC SPECIFICATIONS OF LP-9200<br>28 BASIC SPECIFICATIONS OF LP-9200PS2<br>28 BASIC SPECIFICATIONS OF LP-830PS<br>27 BASIC SPECIFICATIONS OF LP-8300<br>26 BASIC SPECIFICATIONS OF LP-8600<br>24 BASIC SPECIFICATIONS OF LP-8200<br>23 BASIC SPECIFICATIONS OF LP-710<br>23 BASIC SPECIFICATIONS OF LP-800<br>23 BASIC SPECIFICATIONS OF LP-900<br>22 BASIC SPECIFICATIONS OF LP-500<br>(SUM WITHIN CLUSTER 579, AVERAGE 36) |
| LP | 16 | 49 BASIC SPECIFICATIONS OF LP-7000<br>38 BASIC SPECIFICATIONS OF LP-8000<br>38 BASIC SPECIFICATIONS OF LP-8400<br>34 BASIC SPECIFICATIONS OF LP-700<br>30 LP-700S SPEC SHEET & OPTION<br>30 BASIC SPECIFICATIONS OF LP-9200<br>28 BASIC SPECIFICATIONS OF LP-9200PS2<br>28 BASIC SPECIFICATIONS OF LP-830PS<br>27 BASIC SPECIFICATIONS OF LP-8300<br>26 BASIC SPECIFICATIONS OF LP-8600<br>24 BASIC SPECIFICATIONS OF LP-8200<br>23 BASIC SPECIFICATIONS OF LP-710<br>23 BASIC SPECIFICATIONS OF LP-800<br>23 BASIC SPECIFICATIONS OF LP-900<br>22 BASIC SPECIFICATIONS OF LP-500<br>7 ESPER LASER LP-8300<br>(SUM WITHIN CLUSTER 450, AVERAGE 28) |
| SPECIFICATIONS | 14 | 49 BASIC SPECIFICATIONS OF LP-7000<br>38 BASIC SPECIFICATIONS OF LP-8000<br>38 BASIC SPECIFICATIONS OF LP-8400<br>34 BASIC SPECIFICATIONS OF LP-700<br>30 BASIC SPECIFICATIONS OF LP-9200<br>28 BASIC SPECIFICATIONS OF LP-9200PS2<br>28 BASIC SPECIFICATIONS OF LP-830PS<br>27 BASIC SPECIFICATIONS OF LP-8300<br>26 BASIC SPECIFICATIONS OF LP-8600<br>24 BASIC SPECIFICATIONS OF LP-8200<br>23 BASIC SPECIFICATIONS OF LP-710<br>23 BASIC SPECIFICATIONS OF LP-800<br>23 BASIC SPECIFICATIONS OF LP-900<br>22 BASIC SPECIFICATIONS OF LP-500<br>(SUM WITHIN CLUSTER 413, AVERAGE 29) |
| DEVICE | 9 | 117 DEVICE, SEMICONDUCTOR, CARD-PC<br>115 DEVICE, SEMICONDUCTOR, MEMORY<br>111 ELECTRONIC DEVICE, ASIC<br>111 DEVICE, SEMICONDUCTOR, PC CARD PRODUCTS<br>101 DEVICE, COLLABORATION<br>90 ELECTRONIC DEVICE, SEMICONDUCTOR, MICROCOMPUTER<br>82 EPSON NEW PRODUCTS OF ELECTRONIC DEVICES<br>66 ENQUIRY ON EPSON ELECTRONIC DEVICES<br>56 DEVICE, SEMICONDUCTOR, ASSP<br>(SUM WITHIN CLUSTER 849, AVERAGE 94) |
| SEMICONDUCTOR | 7 | 157 SEMICONDUCTOR DIVISION ENVIRONMENTAL GUIDE LINE<br>117 DEVICE, SEMICONDUCTOR, CARD-PC<br>115 DEVICE, SEMICONDUCTOR, MEMORY<br>111 SEMICONDUCTOR DEVICE, ASIC<br>111 DEVICE, SEMICONDUCTOR, PC CARD PRODUCTS<br>90 ELECTRONIC DEVICE, SEMICONDUCTOR, MICROCOMPUTER<br>56 DEVICE, SEMICONDUCTOR, ASSP<br>(SUM WITHIN CLUSTER 757, AVERAGE 108) |
| ELECTRONIC | 4 | 111 ELECTRONIC DEVICE, ASIC<br>90 ELECTRONIC DEVICE, SEMICONDUCTOR, MICROCOMPUTER<br>82 EPSON NEW PRODUCTS OF ELECTRONIC DEVICES<br>66 ENQUIRY ON EPSON ELECTRONIC DEVICES<br>(SUM WITHIN CLUSTER 349, AVERAGE 87) |

FIG. 13

| CLUSTER NAME | NO. OF DOCUMENTS | SCORE | TITLE OF DOCUMENT / SEARCH RESULT |
|---|---|---|---|
| SEMICONDUCTOR | 7 | 157<br>117<br>115<br>111<br>111<br>90<br>56 | SEMICONDUCTOR DIVISION ENVIRONMENTAL GUIDE LINE<br>DEVICE, SEMICONDUCTOR, CARD-PC<br>DEVICE, SEMICONDUCTOR, MEMORY<br>SEMICONDUCTOR DEVICE, ASIC<br>DEVICE, SEMICONDUCTOR, PC CARD PRODUCTS<br>ELECTRONIC DEVICE, SEMICONDUCTOR, MICROCOMPUTER<br>DEVICE, SEMICONDUCTOR, ASSP<br>(SUM WITHIN CLUSTER 757, AVERAGE 108) |
| DEVICE | 9 | 117<br>115<br>111<br>111<br>101<br>90<br>82<br>66<br>56 | DEVICE, SEMICONDUCTOR, CARD-PC<br>DEVICE, SEMICONDUCTOR, MEMORY<br>ELECTRONIC DEVICE, ASIC<br>DEVICE, SEMICONDUCTOR, PC CARD PRODUCTS<br>DEVICE, COLLABORATION<br>ELECTRONIC DEVICE, SEMICONDUCTOR, MICROCOMPUTER<br>EPSON NEW PRODUCTS OF ELECTRONIC DEVICES<br>ENQUIRY ON EPSON ELECTRONIC DEVICES<br>DEVICE, SEMICONDUCTOR, ASSP<br>(SUM WITHIN CLUSTER 849, AVERAGE 94) |
| ELECTRONIC | 4 | 111<br>90<br>82<br>66 | ELECTRONIC DEVICE, ASIC<br>ELECTRONIC DEVICE, SEMICONDUCTOR, MICROCOMPUTER<br>EPSON NEW PRODUCTS OF ELECTRONIC DEVICES<br>ENQUIRY ON EPSON ELECTRONIC DEVICES<br>(SUM WITHIN CLUSTER 349, AVERAGE 87) |
| SUMMARY | 16 | 133<br>49<br>38<br>38<br>34<br>33<br>30<br>28<br>28<br>27<br>26<br>24<br>23<br>23<br>23<br>22 | INTRODUCTION OF EPSON TOHOKU<br>BASIC SPECIFICATIONS OF LP-7000<br>BASIC SPECIFICATIONS OF LP-8000<br>BASIC SPECIFICATIONS OF LP-8400<br>BASIC SPECIFICATIONS OF LP-700<br>INTRODUCTION OF SEIKO EPSON CO.<br>BASIC SPECIFICATIONS OF LP-9200<br>BASIC SPECIFICATIONS OF LP-9200PS2<br>BASIC SPECIFICATIONS OF LP-830PS<br>BASIC SPECIFICATIONS OF LP-8300<br>BASIC SPECIFICATIONS OF LP-8600<br>BASIC SPECIFICATIONS OF LP-8200<br>BASIC SPECIFICATIONS OF LP-710<br>BASIC SPECIFICATIONS OF LP-800<br>BASIC SPECIFICATIONS OF LP-900<br>BASIC SPECIFICATIONS OF LP-500<br>(SUM WITHIN CLUSTER 579, AVERAGE 36) |
| SPECIFICATIONS | 14 | 49<br>38<br>38<br>34<br>30<br>28<br>28<br>27<br>26<br>24<br>23<br>23<br>23<br>22 | BASIC SPECIFICATIONS OF LP-7000<br>BASIC SPECIFICATIONS OF LP-8000<br>BASIC SPECIFICATIONS OF LP-8400<br>BASIC SPECIFICATIONS OF LP-700<br>BASIC SPECIFICATIONS OF LP-9200<br>BASIC SPECIFICATIONS OF LP-9200PS2<br>BASIC SPECIFICATIONS OF LP-830PS<br>BASIC SPECIFICATIONS OF LP-8300<br>BASIC SPECIFICATIONS OF LP-8600<br>BASIC SPECIFICATIONS OF LP-8200<br>BASIC SPECIFICATIONS OF LP-710<br>BASIC SPECIFICATIONS OF LP-800<br>BASIC SPECIFICATIONS OF LP-900<br>BASIC SPECIFICATIONS OF LP-500<br>(SUM WITHIN CLUSTER 413, AVERAGE 29) |
| LP | 16 | 49<br>38<br>38<br>34<br>30<br>30<br>28<br>28<br>27<br>26<br>24<br>23<br>23<br>23<br>22<br>7 | BASIC SPECIFICATIONS OF LP-7000<br>BASIC SPECIFICATIONS OF LP-8000<br>BASIC SPECIFICATIONS OF LP-8400<br>BASIC SPECIFICATIONS OF LP-700<br>LP-700S SPEC SHEET & OPTION<br>BASIC SPECIFICATIONS OF LP-9200<br>BASIC SPECIFICATIONS OF LP-9200PS2<br>BASIC SPECIFICATIONS OF LP-830PS<br>BASIC SPECIFICATIONS OF LP-8300<br>BASIC SPECIFICATIONS OF LP-8600<br>BASIC SPECIFICATIONS OF LP-8200<br>BASIC SPECIFICATIONS OF LP-710<br>BASIC SPECIFICATIONS OF LP-800<br>BASIC SPECIFICATIONS OF LP-900<br>BASIC SPECIFICATIONS OF LP-500<br>ESPER LASER LP-8300<br>(SUM WITHIN CLUSTER 450, AVERAGE 28) |

FIG. 16

| CLUSTERING RESULT SUMMARY TABLE | | | 1610 |
|---|---|---|---|
| SUMMARY | LP | DEVICE | ELECTRONIC |

1620

| CLUSTER NAME | NO. OF DOCUMENTS | SPECIFICATIONS SCORE | SEMICONDUCTOR TITLE OF DOCUMENT / SEARCH RESULT |
|---|---|---|---|
| SUMMARY | 16 | 133<br>49<br>38<br>38<br>34<br>33<br>30<br>28<br>28<br>27<br>26<br>24<br>23<br>23<br>23<br>22 | INTRODUCTION OF EPSON TOHOKU<br>BASIC SPECIFICATIONS OF LP-7000<br>BASIC SPECIFICATIONS OF LP-8000<br>BASIC SPECIFICATIONS OF LP-8400<br>BASIC SPECIFICATIONS OF LP-700<br>INTRODUCTION OF SEIKO EPSON CO.<br>BASIC SPECIFICATIONS OF LP-9200<br>BASIC SPECIFICATIONS OF LP-9200PS2<br>BASIC SPECIFICATIONS OF LP-830PS<br>BASIC SPECIFICATIONS OF LP-8300<br>BASIC SPECIFICATIONS OF LP-8600<br>BASIC SPECIFICATIONS OF LP-8200<br>BASIC SPECIFICATIONS OF LP-710<br>BASIC SPECIFICATIONS OF LP-800<br>BASIC SPECIFICATIONS OF LP-900<br>BASIC SPECIFICATIONS OF LP-500 |
| LP | 16 | 49<br>38<br>38<br>34<br>30<br>30<br>28<br>28<br>27<br>26<br>24<br>23<br>23<br>23<br>22<br>7 | BASIC SPECIFICATIONS OF LP-7000<br>BASIC SPECIFICATIONS OF LP-8000<br>BASIC SPECIFICATIONS OF LP-8400<br>BASIC SPECIFICATIONS OF LP-700<br>LP-700S SPEC SHEET & OPTION<br>BASIC SPECIFICATIONS OF LP-9200<br>BASIC SPECIFICATIONS OF LP-9200PS2<br>BASIC SPECIFICATIONS OF LP-830PS<br>BASIC SPECIFICATIONS OF LP-8300<br>BASIC SPECIFICATIONS OF LP-8600<br>BASIC SPECIFICATIONS OF LP-8200<br>BASIC SPECIFICATIONS OF LP-710<br>BASIC SPECIFICATIONS OF LP-800<br>BASIC SPECIFICATIONS OF LP-900<br>BASIC SPECIFICATIONS OF LP-500<br>ESPER LASER LP-8300 |
| SPECIFICATIONS | 14 | 49<br>38<br>38<br>34<br>30<br>28<br>28<br>27<br>26<br>24<br>23<br>23<br>23<br>22 | BASIC SPECIFICATIONS OF LP-7000<br>BASIC SPECIFICATIONS OF LP-8000<br>BASIC SPECIFICATIONS OF LP-8400<br>BASIC SPECIFICATIONS OF LP-700<br>BASIC SPECIFICATIONS OF LP-9200<br>BASIC SPECIFICATIONS OF LP-9200PS2<br>BASIC SPECIFICATIONS OF LP-830PS<br>BASIC SPECIFICATIONS OF LP-8300<br>BASIC SPECIFICATIONS OF LP-8600<br>BASIC SPECIFICATIONS OF LP-8200<br>BASIC SPECIFICATIONS OF LP-710<br>BASIC SPECIFICATIONS OF LP-800<br>BASIC SPECIFICATIONS OF LP-900<br>BASIC SPECIFICATIONS OF LP-500 |
| DEVICES | 9 | 117<br>115<br>111<br>111<br>101<br>90<br>82<br>66<br>56 | DEVICE, SEMICONDUCTOR, CARD-PC<br>DEVICE, SEMICONDUCTOR, MEMORY<br>ELECTRONIC DEVICE, ASIC<br>DEVICE, SEMICONDUCTOR, PC CARD PRODUCTS<br>DEVICE, COLLABORATION<br>ELECTRONIC DEVICE, SEMICONDUCTOR, MICROCOMPUTER<br>EPSON NEW PRODUCTS OF ELECTRONIC DEVICES<br>ENQUIRY ON EPSON ELECTRONIC DEVICES<br>DEVICE, SEMICONDUCTOR, ASSP |
| SEMICONDUCTOR | 7 | 157<br>117<br>115<br>111<br>111<br>90<br>56 | SEMICONDUCTOR DIVISION ENVIRONMENTAL GUIDE LINE<br>DEVICE, SEMICONDUCTOR, CARD-PC<br>DEVICE, SEMICONDUCTOR, MEMORY<br>SEMICONDUCTOR DEVICE, ASIC<br>DEVICE, SEMICONDUCTOR, PC CARD PRODUCTS<br>ELECTRONIC DEVICE, SEMICONDUCTOR, MICROCOMPUTER<br>DEVICE, SEMICONDUCTOR, ASSP |
| ELECTRONIC | 4 | 111<br>90<br>82<br>66 | ELECTRONIC DEVICE, ASIC<br>ELECTRONIC DEVICE, SEMICONDUCTOR, MICROCOMPUTER<br>EPSON NEW PRODUCTS OF ELECTRONIC DEVICES<br>ENQUIRY ON EPSON ELECTRONIC DEVICES |

FIG. 17

| CLUSTERING RESULT SUMMARY TABLE | | | |
|---|---|---|---|
| www.epson.co.jp | www.i-love-epson.co.jp | OTHER URL | 1740 |

1730

| CLUSTER NAME | NO. OF DOCUMENTS | SEARCH RESULT (TITLE OF DOCUMENT) |
|---|---|---|
| www.epson.co.jp | 31 | SEMICONDUCTOR DIVISION ENVIRONMENTAL GUIDE LINE<br>MESSAGE TEXT FROM SENIORS<br>http://www.epson.co.jp/epson/school/youkoso/<br>http://www.epson.co.jp/epson/school/youkoso/<br>INTRODUCTION OF EPSON TOHOKU<br>[windy NOTE]<br>http://www.epson.co.jp/epson/school/youkoso/<br>EPSON TOHOKU   MESSAGE FROM SENIORS<br>LANRICE CO. AND EPSON, SEMICONDUCTOR BUSINESS<br>EPSON TOHOKU    CORPORATE DATA<br>DEVICE - SEMICONDUCTOR - CARD-PC<br>ENVIRONMENTAL GUIDE LINE OF EACH PLANT<br>DEVICE - SEMICONDUCTOR - MEMORY<br>http://www.epson.co.jp/epson/school/youkoso/<br>http://www.epson.co.jp/epson/school/youkoso/<br>DUTY ASSIGNMENT<br>ELECTRONIC DEVICE - SEMICONDUCTOR - ASIC<br>DEVICE - SEMICONDUCTOR - PC CARD PRODUCTS<br>http://www.epson.co.jp/epson/japanese/behind/<br>EPSON TOHOKU    CORPORATE POLICY<br>CONSTRUCTION OF SAKATA NO. 5 COMPLETED<br>DEVICE COLLABORATION PAGE<br>EPSON ELECTRONIC DEVICES INDEX<br>TOHOKU EPSON CORPORATION    ENVIRONMENTAL GUIDE LINE<br>MONSIEUR<br>FOUNDATION OF SHANGHAI EPSON ELECTRONICS<br>EPSON Ecology<br>ELECTRONIC DEVICES - SEMICONDUCTOR - MICROCOMPUTER<br>SEIKO EPSON GROUP<br>http://www.epson.co.jp/epson/japanese/behind/<br>EPSON NEW PRODUCTS OF ELECTRONIC DEVICES |
| www.i-love-epson.co.jp | 14 | BASIC SPECIFICATIONS OF LP-7000<br>BASIC SPECIFICATIONS OF LP-8000<br>BASIC SPECIFICATIONS OF LP-8400<br>BASIC SPECIFICATIONS OF LP-700<br>BASIC SPECIFICATIONS OF LP-9200<br>BASIC SPECIFICATIONS OF LP-9200PS2<br>BASIC SPECIFICATIONS OF LP-830PS<br>BASIC SPECIFICATIONS OF LP-8300<br>BASIC SPECIFICATIONS OF LP-8600<br>BASIC SPECIFICATIONS OF LP-8200<br>BASIC SPECIFICATIONS OF LP-710<br>BASIC SPECIFICATIONS OF LP-800<br>BASIC SPECIFICATIONS OF LP-900<br>BASIC SPECIFICATIONS OF LP-500 |
| OTHER URL | | DESTRUCTION OF EARTH ENVIRONMENT: DESTRUCTION OF OZONE LAYER, OZONE LAYER IS...<br>KX-Server:PP-410 |

INFORMATION CATEGORIZING METHOD AND APPARATUS, AND A PROGRAM FOR IMPLEMENTING THE METHOD

TECHNICAL FIELD

The present invention relates to an information processing method, and an information processing apparatus for presenting a search result in such a way that allows a user to easily see the result, by performing a clustering process on a search result provided by a general-purpose search service, and to a storage medium for storing an information categorizing process software program.

BACKGROUND ART

The presence of a search service is important to searching for information desired by a user from among a vast amount of information present on a network. For example, to search for a Web page using the Internet, a user selects one service from among a plurality of search services, and then inputs a keyword as a search request to obtain his desired information. The search service performs information searching in response to the input keyword, and presents the search result to the user.

Information searched by the search service frequently becomes large in volume, and the user has difficulty finding the user's desired information from among the vast amount of information. Since the Web pages are currently more and more increasing, presenting a number of pieces of searched information in an easy-to-understand fashion to the user becomes a serious concern.

Methods of presenting the searched information organized in an easy-to-see fashion to the user are currently becoming commercially available. For example, researching is performed using a keyword obtained from the results that have been searched using the keyword input by the user. The user thus narrows down the search so that a Web page desired by the user becomes easy to find. Specifically, a keyword characteristic of a set of search results of the search is extracted to find a set of information really desired by the user.

Finding a set of pieces of information having a property of similarity from a vast amount of information is called a "clustering". The clustering, which is a well-known technique in the information processing field, is widely used to categorize a large amount of documents.

It is not an accepted practice to subject search results, provided by search services (general-purpose search services) widely used by common users, to the clustering process. As already discussed, typically, information is extracted in response to the input keyword, and the extracted information is then simply presented to the user in a simple list. The user is thus forced to perform a troublesome job of finding the user's desired information from numerous listed pieces of information.

It is an object of the present invention to present searched information in an easy-to-see fashion to a user by clustering the search result provided by a general-purpose search service.

BRIEF DESCRIPTION OF THE DRAWINGS

FIG. 2 shows a plurality of documents as a result of search results provided by a search service used in the first embodiment.

FIG. 5 shows the content of a feature table illustrating the relationship between a feature extracted from the title of each document and the document having the title containing the feature.

FIG. 6 shows a categorize result of each document based on the feature table shown in FIG. 5.

FIG. 7 shows a clustering result of document titles based on the categorize result shown in FIG. 6.

FIG. 11 shows clustering results that have been obtained by clustering a plurality of documents resulting from the search by a search service.

FIG. 13 shows results that have been obtained by subjecting the clustering result shown FIG. 11 to a cluster order rearranging process.

FIG. 16 shows a clustering result shown in FIG. 11 and a summary table thereof.

FIG. 17 shows a clustering result that has been obtained by clustering URL addresses and a summary table thereof.

DISCLOSURE OF THE INVENTION

Figure 1:
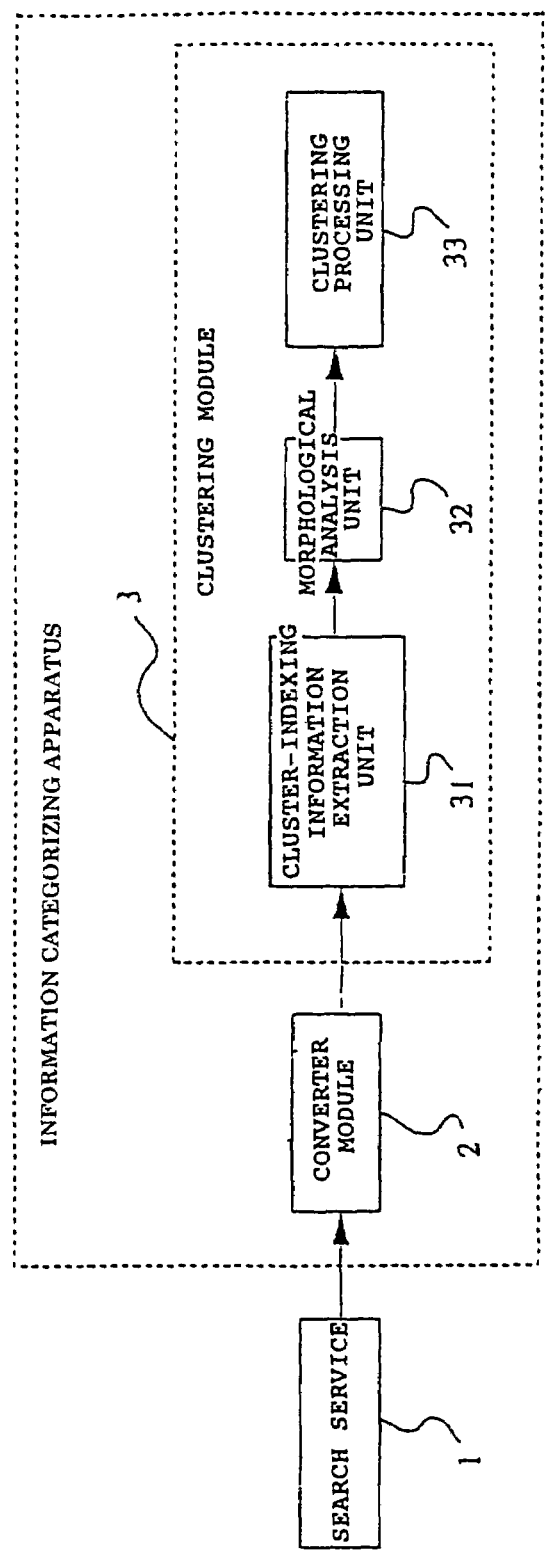
FIG. 1 is a block diagram of a first embodiment of the present invention, showing the construction of an information categorizing apparatus that performs a clustering process on a search result provided by one search service.

To achieve the above object, an information categorizing method of the present invention includes a step of acquiring a plurality of search results searched by a search service through a clustering module, a step of performing a clustering process on the search results through the clustering module, and a step of outputting the clustering result from the clustering module.

The information categorizing method may further include a step of converting, through a converter module, the search result searched by the search service into a format that is processed by the clustering module.

The converter module is arranged correspondingly to each of a plurality of search services when the clustering process is performed correspondingly to the plurality of search services.

A search process may be performed using one search service selected from the plurality of search services and the clustering process may be performed on the search result searched by the selected search service. Search processes may be performed in parallel using at least two search services of the plurality of search services, respective search results may be collected, and the clustering process may be performed on the collected search results. Search processes may be performed in parallel using at least two search services of the plurality of search services, and the clustering process may be individually performed on the search results.

When the clustering process is performed on the search result, information to be clustered is at least one of the title of a document, a URL address, an update date, and a file size of an individual search result.

In the information categorizing method, the order of cluster of a clustering result may be rearranged using a score indicating the degree of match between the clustering result and a search request for each document and the clustering result with the cluster order thereof rearranged may be then output.

The rearranging process of the cluster order may include a step of determining the maximum value of the scores of the documents in each cluster to treat the maximum score of each cluster as the cluster score, and a step of rearranging the cluster order using the cluster score.

The rearranging process of the cluster order may include a step of determining a score at a midway point or a substantially midway point in each cluster when the documents contained in each cluster are arranged in the order of magnitude of scores assigned thereto, to treat the score at the midway point or the substantially midway point as the cluster score, and a step of rearranging the cluster order using the cluster score.

The cluster score determining step for rearranging the cluster order may be individually performed correspondingly to the plurality of search services when the clustering process is performed correspondingly to the search results provided by the plurality of search services.

The clustering process may be performed based on a feature, wherein the title of each document is detected and a word characteristic of and contained in the title is extracted as the feature.

The manner of outputting the clustering result with the cluster order rearranged may include a step of displaying the clusters in the order of the magnitude of scores from a high score to a low score and when there are clusters having the same cluster score, one of the clusters having a larger number of documents therewithin may be positioned higher in the cluster order.

The method may include a step of generating a clustering result summary table indicating the summary of the clustering results based on the clustering result, and a step of outputting the clustering result summary table together with the clustering result.

The clustering result summary table may include a cluster name of each cluster which is obtained through the clustering process.

The clustering result may be mutually linked with the clustering result summary table. When a cluster name portion of the clustering result summary table is designated, the corresponding cluster portion of the clustering result is displayed. When one cluster portion of the clustering result is designated, the clustering result summary table is displayed.

When a cluster name portion of the clustering result summary table is designated to display the corresponding cluster portion of the clustering result, the head portion of an outline surrounding the cluster or the last line in the outline of the cluster present immediately prior to the first cluster is displayed on the top of a screen.

When the one cluster portion of the clustering result is designated to display the clustering result summary table, the clustering result summary table is displayed with the head portion thereof appearing first on the screen.

The arrangement order of clusters forming the clustering result summary table may with the arrangement order of the clusters in the clustering result.

When the clustering result summary table is displayed, the manner of displaying the cluster names is changed in the clustering result summary table depending on the importance of each cluster in response to the clustering result.

When a plurality of documents to be clustered are the ones which have been searched using a keyword input by a user, the manner of displaying the cluster names containing the keyword input by the user is different in the clustering result summary table from the other cluster names.

An information categorizing apparatus of the present invention includes a clustering module for acquiring a plurality of search results searched by a search service, performing a clustering process on the search results, and outputting the clustering result.

The information categorizing apparatus may further include a converter module for converting the search result searched by the search service into a format that is processed by the clustering module.

The information categorizing apparatus may include a cluster order setting module which rearranges the order of cluster of a clustering result using a score indicating the degree of match between the clustering result and a search request for each document and outputs the clustering result with the cluster order thereof rearranged.

The information categorizing apparatus may further include a summary table generator unit for generating a clustering result summary table indicating the summary of the clustering results based on the clustering result, and a display control unit for outputting the clustering result summary table together with the clustering result.

A storage medium of the present invention stores an information categorizing software program in which a clustering module performs a clustering process on a plurality of search results that have been searched by a search service in response to a search request of a user, and outputs the clustering result. The information categorizing software program includes a step of acquiring the search result from the search service, a step of performing the clustering process on the acquired search result and a step of outputting the clustering result.

The step of performing the clustering process may be performed subsequent to a step of converting the search result searched by the search service into a format that is processed by the clustering module.

The information categorizing software program may include a step of rearranging the order of cluster of the clustering result using a score indicating the degree of match between the clustering result and a search request for each document and a step of outputting the clustering result with the cluster order thereof rearranged.

The information categorizing software program may include a step of generating a clustering result summary table indicating the summary of the clustering results based on the clustering result, and a step of outputting the clustering result summary table together with the clustering result.

BEST MODE FOR CARRYING OUT THE INVENTION

The embodiments of the present invention are now discussed. The discussion of the embodiments that follows not only covers the information categorizing method and the information categorizing apparatus but also the specific process content of the information categorizing process software program of the present invention stored in the storage medium.

FIRST EMBODIMENT

FIG. 1 shows a first embodiment of the present invention, including, as major components thereof, a search service 1, a converter module 2, and a clustering module 3. The converter module 2 and the clustering module 3 in combination corresponds to an information categorizing apparatus.

The search service 1 is a widely available one such as the Internet. When a user inputs a keyword as a search request, information searching is performed on Web pages, for example, in response to the input keyword. A search result provided by the search service 1 is output in a file form, and is transferred to the clustering module 3. There is typically available a plurality of search services 1, and output data formats become different from search service to search service. The converter module 2 is arranged to convert the file into a form that allows the file to be read regardless of whatever different search services might be employed.

The clustering module 3 includes a cluster-indexing information extraction unit 31 which extracts information (i.e., information to be clustered), required for clustering, from a search result file content output from the search service 1 (a file content subsequent to a conversion by the search service 1), a morphological analysis unit 32 for performing a morphological analysis to the information extracted as the cluster-indexing information, and a clustering processing unit 33 for performing a clustering process based on the morphological analysis result.

The cluster-indexing information extraction unit 31 extracts the information to be clustered from the search result provided by the search engine 1 and converted by the converter module 2. Several pieces of information may be contemplated as the cluster-indexing information (as will be discussed later). In this embodiment, the title (the topic) of each of a plurality of documents extracted as the search result is extracted as the cluster-indexing information. For example, a plurality of documents D1, D2, . . . , D7 are now obtained as the search results as shown in FIG. 2. The documents D1, D2, . . . , D7 respectively contain titles T1, T2, . . . ,T7, and bodies A1, A2, . . . , A7 corresponding thereto.

In response to the search results, the cluster-indexing information extraction unit 31 analyzes the documents D1, D2, . . . , D7, and detects the document titles thereof. The detection of the title by the cluster-indexing information extraction unit 31 is specifically carried out as below.

In a first method, a document structural format defines one portion thereof reserved for a document title. That portion is treated as a title. In a second method, a document structural format defines one portion thereof reserved for the displaying of characters of size larger than standard size. That portion is treated as a title. In a third method, sentences of a fixed number or words of a fixed number from the start of the document are extracted as a document title. Further, the first method, the second method, and the third method are successively performed in the following way. When the portion defined as a title is found in the first method, that portion is used as the title. Otherwise, the second method is performed. When there is a designation for the displaying of characters of size larger than the standard size, that portion is treated as a title. Otherwise, the third method is performed to extract the title.

The morphological analysis unit 32 performs morphological analysis on the portions extracted as the title from the document extracted by the cluster-indexing information extraction unit 31.

Figure 3:
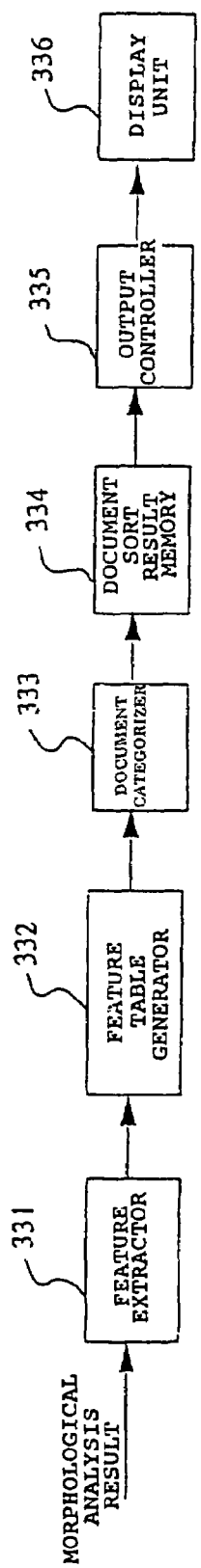
FIG. 3 is a block diagram showing the construction of a clustering processing unit shown in FIG. 1.

Referring to FIG. 3, the clustering processing unit 33 includes a feature extractor 331, a feature table generator 332, a document categorizer 333, a document categorize result memory 334, an output controller 335, and a display unit 336. The feature extractor 331 extracts features from the result of the morphological analysis provided by the morphological analysis unit 32.

The feature table generator 332 generates a feature table indicating the relationship between the features extracted by the feature extractor 331 and the documents D1–D7. The feature table will specifically be discussed later.

The document categorizer 333 references the above-mentioned feature table, thereby grouping the documents D1–D7 into a plurality of clusters from the standpoint of semantical similarity. Specifically, based on the features contained in the titles T1, T2, . . . , T7 of the respective documents D1, D2, . . . , D7, documents having the same feature in common are treated as one group, thereby forming one cluster. The document categorizer 333 may contain a synonymous feature dictionary (not shown). To group the documents having the same feature in common into a cluster, the document categorizer 333 may determine a common feature referencing the synonymous feature dictionary for the presence of any synonym. When there is a synonym, the document categorizer 333 may include the corresponding document into the same cluster.

The document categorize result memory 334 stores the content categorized by the document categorizer 333. The output controller 335 reads the content of the document categorize result memory 334, and displays the content on the display unit 336.

Figure 4:
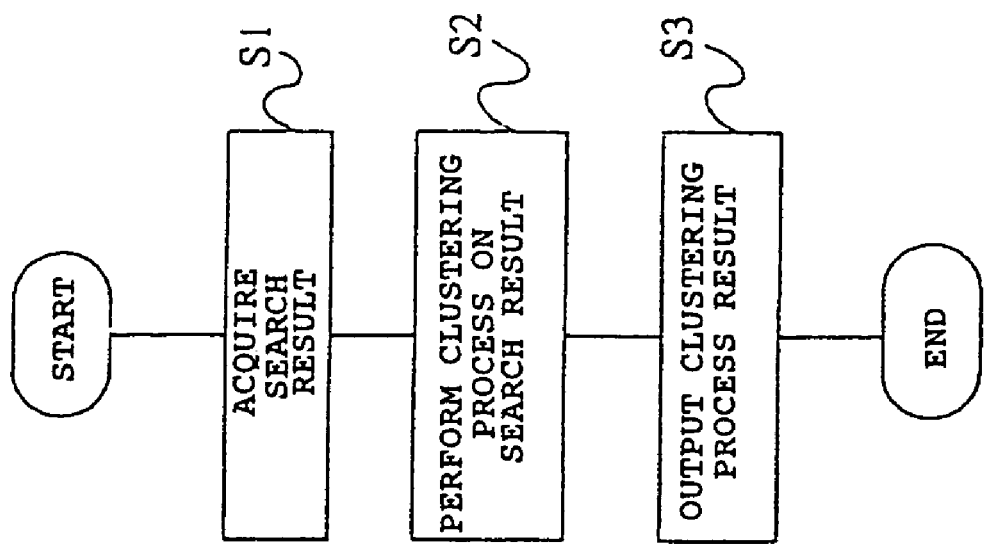
FIG. 4 is a flow diagram diagrammatically showing the steps of a document categorizing process in the first embodiment.

The information categorizing process steps of the present invention performed in the above-referenced arrangement are now discussed. The information categorizing process steps of the present invention are roughly shown in a flow diagram in FIG. 4. Specifically, a step of acquiring a search result provided by a general-purpose search engine is performed (step S1), a step of performing a clustering process on the acquired search result is performed (step S2), and a step of outputting the clustering result (step S3) is performed. The information categorizing process steps are now discussed in more detail, referring to specific examples.

The search service 1 outputs as the search result the documents D1, D2, . . . , D7, which have been searched using a keyword input by a user, as shown in FIG. 2. The search result, output in a file form, is converted into a format which can be processed by the clustering module 3, and is then transferred to the clustering module 3.

The cluster-indexing information extraction unit 31 extracts the titles from the documents D1, D2, . . . , D7 input to the clustering module 3. For example, the title T1 is detected from the document D1, the title T2 is detected from the document D2, the title T3 is detected from the document D3, . . . . The titles T1, T2, . . . , T7 are thus respectively detected from the documents D1, D2, . . . , D7.

The morphological analysis unit 32 performs morphological analysis to the titles T1, T2, . . . , T7 and feeds the morphological analysis result to the clustering processing unit 33. In the clustering processing unit 33, the feature extractor 331 extracts features present in the titles T1, T2, ..., T7 based on the morphological analysis result provided by the morphological analysis unit 32.

The feature table generator 332 generates a feature table indicating the relationship between the features and the documents having the respective titles containing the features. FIG. 5 shows an example of the feature table. The feature table here lists the relationship between the features of three or more types extracted from the documents and the documents having the titles containing the features. Numbers listed in the feature table indicate the number of a feature contained in the title of each document. For example, the number of the feature "sheet" contained in each of the titles T1, T4, T6, and T7 of the documents D1, D4, D6, and D7 is one.

Referring to the feature table shown in FIG. 5, the documents D1, D4, D6, and D7 contain the feature "sheet" in the titles thereof. The feature "cassette" is contained in the documents D1, D4, and D7, and the feature "mounting" is contained in the documents D2, D3, D5, and D7. Returning to FIG. 2, the feature portion in the titles are underlined.

The document categorizer 333 references such a feature table to cluster the features. The categorizing result is shown in FIG. 6.

The categorizing result is also stored in the document categorize result memory 334. In the document categorize result shown in FIG. 6, reference is made to a cluster (containing documents D1, D4, D6, and D7) categorized according to the "sheet". As shown in FIG. 2, the document D1 relates to the sheet cassette, the document D4 relates to the sheet setting, the document D6 covers the smearing of sheets through printing, and the document D7 relates to the mounting of the sheet cassette.

In this way, all documents D1, D4, D6, and D7 relate to the sheet. There will be no problem if these documents are grouped in the same cluster, and the categorize result is deemed appropriate.

As for the clusters categorized according to the feature "cassette" (including documents D1, D4, and D7), the document D1 relates to the sheet cassette, the document D4 relates to the sheet setting, and the document D7 relates to the mounting of the sheet cassette, as described in the documents shown in FIG. 2.

All documents D1, D4, D6, and D7 cover the setting of sheets. There will be no problem if these documents are grouped in the same cluster, and the categorize result is deemed appropriate.

Reference is made to the cluster (containing documents D2, D3, D5, and D7) categorized according to the feature "mounting". As shown in FIG. 2, the document D2 relates to the mounting of an expansion memory, the document D3 relates to the mounting of an interface card, the document D5 relates to the mounting of a hard disk, and the document D7 relates to the mounting of a sheet cassette.

All documents D2, D3, D5, and D7 relate to the mounting of something. There will be no problem if these documents are grouped in the same cluster, and the categorize result is deemed appropriate.

The reason why such an appropriate categorizing is performed is that the features are extracted from the document titles, and that the documents are categorized according to the features. The writer of each document typically conveys the main point of the document in the title of the document. Categorizing the documents using the features contained in the title of each document prevents the categorize result from becoming discursive and lowers the possibility of generating a noise cluster. Since the writer of each document conveys the main point of the document in the document title, the categorizing focuses on the viewpoint of the writer of the document.

FIG. 7 shows the clustering result that is actually presented to the user. Listed in the table shown in FIG. 7 are the features and the titles containing respective features. Viewing the table of the clustering result, the user clicks a title portion that could possibly contain information desired by the user, and the body of the document corresponding to the title then appears.

As described above, in the present embodiment, the user utilizes a general-purpose search service, and enters a keyword to the search service. When the documents D1, D2, ..., D7 are found, the titles T1, T2, ..., T7 thereof are extracted, and the clustering process is then performed on the documents D1, D2, ..., D7 based on the features contained in the titles T1, T2, ..., T7.

Conventionally, the search result has been a simple listing of search result provided by the search service. In contrast, the present embodiment presents the clustering result based on the title content of the search result. The clustering result (shown in FIG. 7), clustered according to each feature contained in the titles, is thus presented to the user in an easy-to-see fashion.

If the user finds information of interest to him, the user simply clicks the title portion. The document having the title then appears.

In the above discussion, the search result, provided by a single general-purpose search service, is clustered. Alternatively, the present invention is applicable to search results provided by a plurality of search services.

The search services can have their own specialty fields. For example, one search service has a large storage of sports-related information, another search service stores a great deal of academic field information, and another search service stores a vast amount of show-business related information. The search services stores abundant information in their own specialty fields, and each user has a good chance of retrieving his desired information therefrom. In information searching, the search services are selectively used in view of search purposes. The clustering process using a plurality of search services is now discussed.

Figure 8:
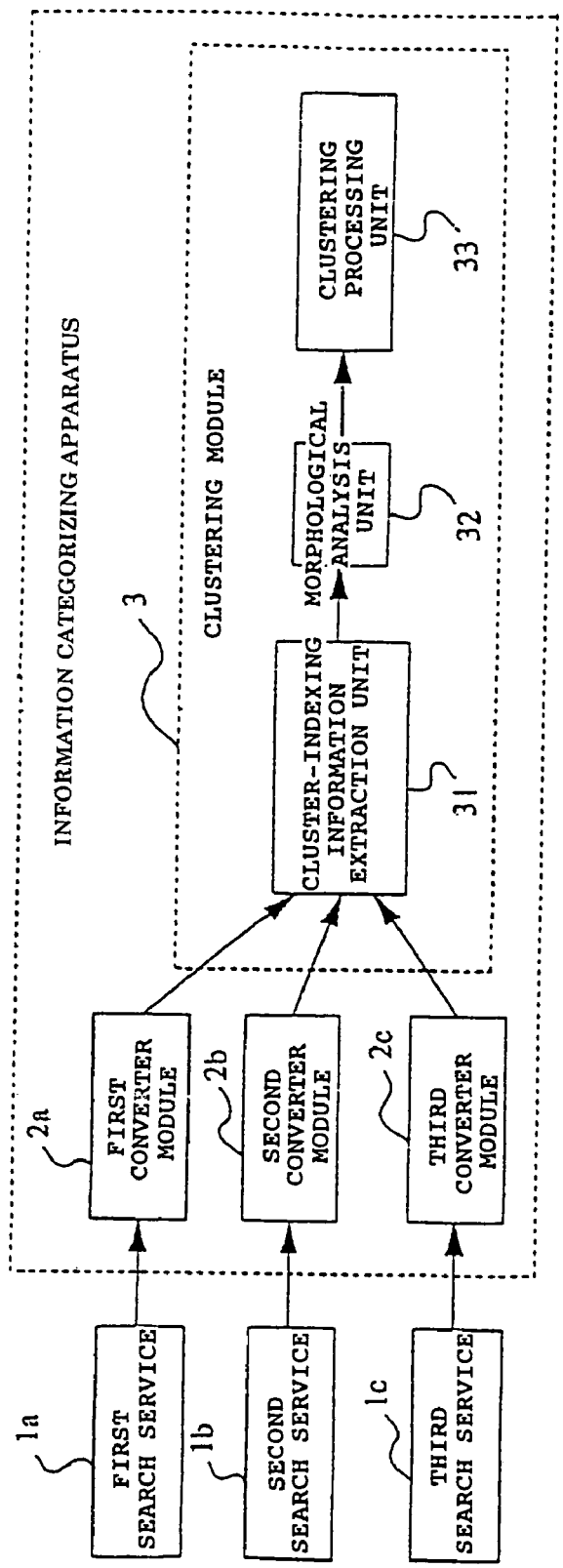
FIG. 8 is a block diagram showing the construction of an information categorizing apparatus that clusters the search result provided by a single selected search service.

FIG. 8 shows the construction of an information categorizing apparatus for performing the above-referenced clustering process using a plurality of search services. There are available three search services of a first search service 1a, a second search service 1b, and a third search service 1c.

When a plurality of search services (the search services 1a, 1b, and 1c here) is used, there are variations in the content, the size, and the output order of the search results provided by the search services. For this reason, the apparatus includes, correspondingly to the search services 1a, 1b, and 1c, converter modules 2a, 2b, and 2c for converting the files from the search services 1a, 1b, and 1c into a format that can be handled by the clustering module 3. Since the construction of the clustering module 3 here remains unchanged from that of the counterpart shown in FIG. 1, like elements are identified with like reference numerals.

With the arrangement, a user can select the search service in view of the field of information the user desires. For example, the first search service 1a has an edge in sports. To search for sports-related information, information searching is performed using the first search service 1a. If the second search service 1b has an edge in the academic field, the second search service 1b is used to search for academic information.

In this way, the user selects the search service depending on desired information. Further, the clustering module 3 performs the clustering process on the search result so that the search result is presented to users in an easy-to-see fashion. The clustering process has already been discussed.

The selective use of the plurality of search services in this way allows information searching to be performed in view of the advantage of the respective search service. The selective use of the plurality of search services also allows the search services to be switched from one to another when the one search service is busy.

Figure 9:
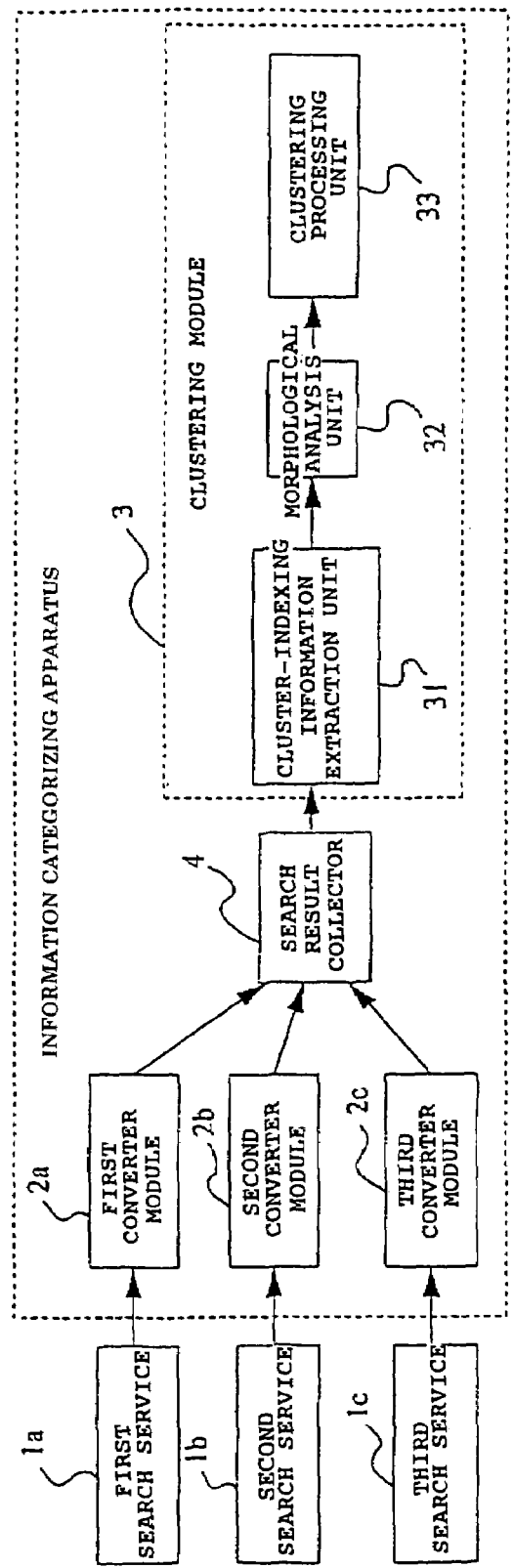
FIG. 9 is a block diagram showing the construction of an information categorizing apparatus that clusters the search results provided by a plurality of search services.

Searching may be performed in parallel by the plurality of search services, the search results provided by these search services may be then combined, and the clustering process may be performed onto the combined search result. FIG. 9 simply shows an arrangement that operates in this way.

Besides the arrangement shown in FIG. 8, the arrangement shown in FIG. 9 additionally includes a search result collector 4, for combining individual search results, added between the converter modules 2*a*, 2*b*, and 2*c* correspondingly arranged for the first through third search services 1*a*, 1*b*, and 1*c* and the clustering module 3. The rest of the construction remains unchanged from that shown in FIG. 8, and like elements are identified with like reference numerals.

With this arrangement, the plurality of search services (the first through third search services 1*a*, 1*b*, and 1*c* here) concurrently perform searching in parallel in response to a keyword input by a user, the converter modules 2*a*, 2*b*, and 2*c* correspondingly arranged for the search services 1*a*, 1*b*, and 1*c* respectively convert the individual search results respectively provided by the search services 1*a*, 1*b*, and 1*c* into a format that can be processed by the clustering module 3, and the search result collector 4 then receives and combines the converted individual search result files. Upon receiving the combined result, the clustering module 3 performs the above-referenced clustering process on the combined result.

The use of the plurality of search services for information searching acquires a wide variety of information, which could not be obtained using a single search service. Since the use of the plurality of search services widens the search area, information searching is performed in an exhaustive fashion. The user easily and efficiently comes to grips with what information associated with the keyword input by himself is globally present. The information thus obtained is subjected to the above-referenced clustering process and is presented to the user in an easy-to-see fashion.

When the first through third search services 1*a*, 1*b*, and 1*c* shown in FIG. 9 are used for information searching, the clustering process may be performed on the individual search results provided by the search services 1*a*, 1*b*, and 1*c* (i.e., the outputs of the converter modules 2*a*, 2*b*, and 2*c*), rather than on the combination of the search results provided by the search services 1*a*, 1*b*, and 1*c* (i.e., the outputs of the converter modules 2*a*, 2*b*, and 2*c*). The individual clustering results may be then presented to the user.

A number of pieces of information widely distributed is thus efficiently searched. The user may compare the individual clustering results derived from the individual search results provided by the first through third search services 1*a*, 1*b*, and 1*c* and may learn the characteristics of each search service.

This embodiment is not limited to the above discussion, and various modifications are possible within the scope of this embodiment. For example, in the above-referenced embodiment, the cluster-indexing information (the information to be clustered) is the title of the searched document. Besides the document title, the cluster-indexing information may be one of a URL address (excluding http://), an update date (a simple time or date/hour/time within the latest one month), and a file size (a byte size of the body of a Web page). These may be used solely or in combination. By selecting the cluster-indexing information, the apparatus performs clustering in a manner characteristic of the selected cluster-indexing information. What cluster-indexing information to select may be arranged as selection items from which the user initially selects in a menu. If any selected item is not present, another item may be used. For example, when a title is selected but no title is available on a corresponding Web page, a URL address may be used.

The process program for performing the information categorizing process in this embodiment may be stored in storage media such as a floppy disk, an optical disk, and a hard disk. Such storage media fall within the scope of the present invention. The process program may be acquired through a network.

SECOND EMBODIMENT

A second embodiment of the present invention is now discussed.

As discussed in connection with the first embodiment, the clustering method of extracting a feature from the title of a document is excellent in terms of the amount of computation and process time and permits appropriate clustering. Since the amount of information to be clustered is relatively small for the overall volume of each document, the entire document is not always properly clustered. A title may not properly represent the content of the document, or an inharmonious title largely unrelated to the content of a document may be used. In such a case, clustering accuracy is substantially degraded with no good clustering result expected.

The clustering method based on the extracted feature checks the frequency of occurrence of the feature, and then automatically categorizes the documents for clustering. Since such a clustering process does not parse the document, the resulting clusters (a set of documents derived through the clustering process) are not necessarily a set of documents having semantic similarity.

Even in such a case, information categorizing preferably presents a clustering result, satisfying the search requirement of the user.

In this embodiment, the search result obtained from a general-purpose search service is subjected to the clustering process, and the cluster order of the clusters derived through the clustering process is rearranged. The clustering result is thus presented to the user in a manner that meets the search requirement of the user.

The second embodiment of the present invention is now discussed.

Figure 10:
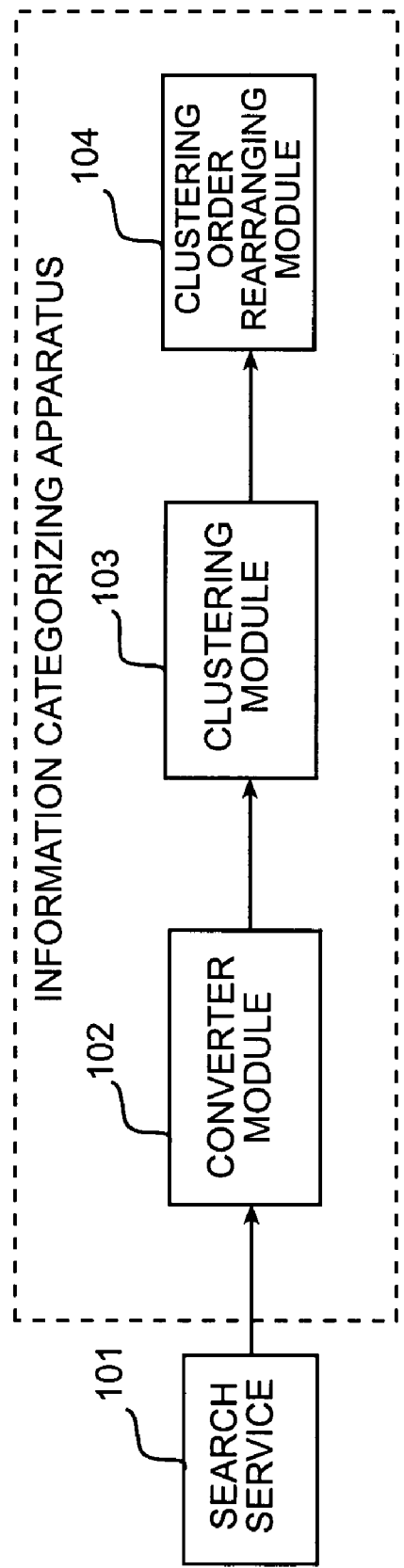
FIG. 10 is a block diagram showing a second embodiment of the present invention.

FIG. 10 shows the construction of the second embodiment of the information categorizing apparatus of the present invention. Referring to FIG. 10, there are shown, as major components, a search service 101, a converter module 102, a clustering module 103, and a cluster order rearranging module 104. The converter module 102, the clustering module 103, and the cluster order rearranging module 104 in combination corresponds to the information categorizing apparatus. In particular, this embodiment is characterized by the cluster order rearranging module 104.

The search service 101 is a widely available one such as the Internet. When a user inputs a keyword as a search request, information searching is performed on Web pages, for example, in response to the input keyword. A search result provided by the search service 101 is output in a file form, and is transferred to the clustering module 103. There is typically available a plurality of search services, and output data formats become different from search service to search service. The converter module 102 is arranged to convert the file into a form that allows the file to be read regardless of whatever different search services might be employed.

The clustering module 103 performs the clustering process to the search result provided by the search service 101 (the file content converted by the converter module 102). In this embodiment, a title is extracted from a document, a word characteristic of and contained in the title is extracted as a feature, and the extracted feature is subjected to the clustering process.

Specifically, a portion extracted as the title of the document is subjected to morphological analysis, and a characteristic word is extracted from the morphological analysis result as the feature. A feature table indicating the relationship between the feature and the document associated with the feature is generated. For example, the feature table associates the feature with the document corresponding thereto, thereby listing the number of features contained in the title of each document. For example, features such as "summary", "LP", "specifications", "device", "semiconductor", and "electronic" are extracted from documents. The feature table lists the number of each feature contained in the title of each document.

A plurality of documents is now grouped into a plurality clusters, each having semantic similarity, based on the feature table. Specifically, based on the feature contained in the title of each document, documents having the feature in common are grouped as one set, i.e., one cluster.

The clustering result shown in FIG. 11 is now output by the clustering module 103. Referring to FIG. 11, there is shown a table listing, as already discussed, the name of each cluster obtained through the clustering process (the cluster name here corresponds to the above-referenced feature), the title of each document belonging to the cluster, the number of documents contained in the cluster, and a number indicating a score of each title.

The score is used as an objective measure indicating the degree of match between the input keyword and each document. The larger the score, the higher the degree of match of the document to the keyword. Since the score indicates the degree of match of the document to the keyword, the unit of score becomes different depending on the search service, for example in % or points. In this embodiment, the score is expressed in points.

Referring to FIG. 11, the clustering results provided by the clustering module 103 are arranged in the order of the count of documents contained in the cluster. As already discussed, the summary cluster, the LP cluster, the specifications cluster, the device cluster, the semiconductor cluster, and the electronic cluster are arranged in the order from the top to the bottom of the table.

The cluster order rearranging module 104 rearranges the display order of the clusters based on the clustering result provided by the clustering module 103. The detail of the rearrangement of the display order will be discussed later.

The second embodiment of the present invention thus constructed is discussed.

Figure 12:
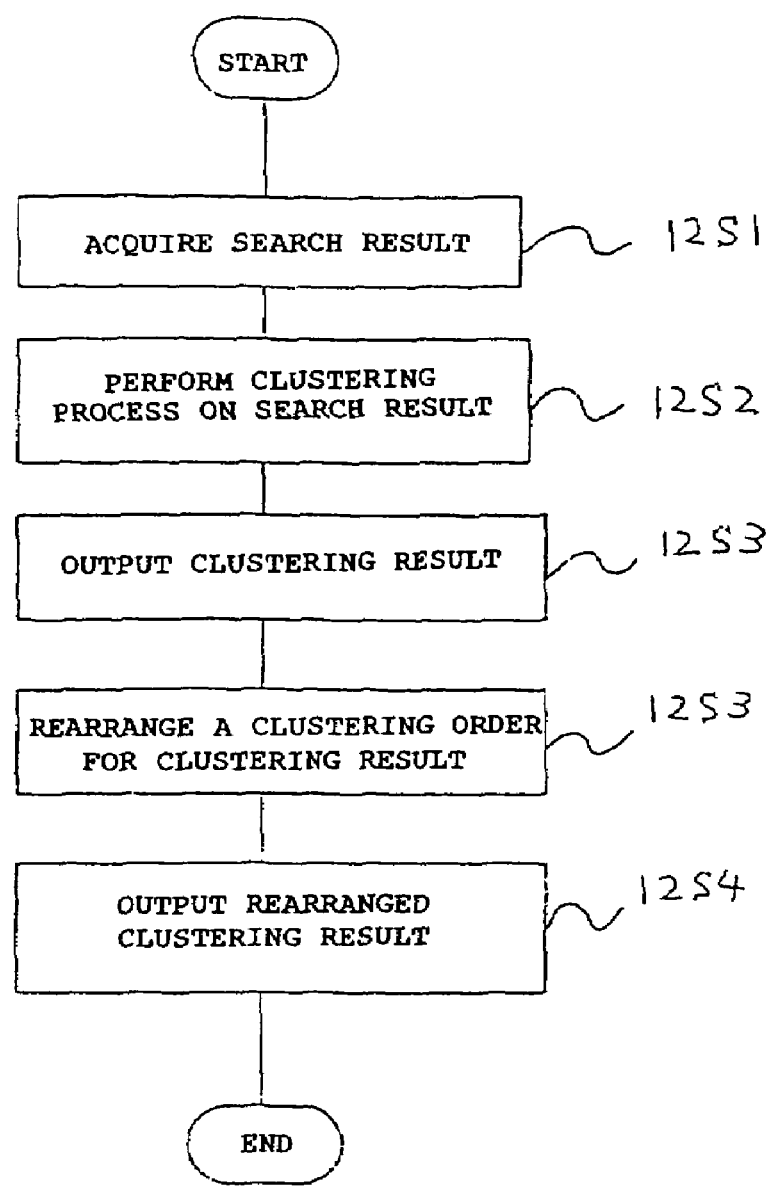
FIG. 12 is a flow diagram diagrammatically showing information categorizing process steps in accordance with the second embodiment of the present invention.

FIG. 12 diagrammatically shows a flow diagram of the information categorizing process steps of this embodiment. A search result searched by the search service 101 is acquired (step 12S1), the clustering process is performed on the acquired search result (step 12S2), and the clustering result is output (step 12S3). The cluster order of the clustering result is rearranged (step 12S4), and the rearranged clustering result is output (step 12S5). The information categorizing process is discussed in more detail, referring to a specific example.

In this embodiment, the clustering process performed by the clustering module 103 extracts the title of each document from the documents searched by the search service 101, extracts the features from the titles, generates the feature table indicating the relationship between the extracted features and the documents corresponding to the extracted features, and groups the documents into a plurality of clusters according to semantic similarity based on the content of the feature table. In this embodiment, the user inputs the keyword "semiconductor" to the search service 101 as a search request, and the clustering module 103 clusters a number of obtained documents in response. FIG. 11 shows the clustering results.

The clustering result, provided by the clustering module 103, is input to the cluster order rearranging module 104 for the following process.

As for the clusters (the summary cluster, the LP cluster, the specifications cluster, the device cluster, the semiconductor cluster, and the electronic cluster) in the clustering result shown in FIG. 11, scores of the documents belonging to each corresponding cluster are averaged. In this case, the scores are summed in each cluster, and the sum is then divided by the number of documents contained in the cluster. A simple arithmetic average is thus determined.

For example, in the summary cluster shown in FIG. 11, the sum of the scores in the cluster is 579 points, and the number of documents is 16 in the search result. The average score is thus approximately 36 points. The sum of the scores of the "LP" cluster is 450 points with the number of the documents therewithin being 16. The average score of the LP cluster is approximately 28 points. Similarly, the sum of the "specifications" cluster is 413 points with the number of the documents being 14. The average score of the specifications cluster is approximately 29 points. The sum of the scores of the "device" cluster is 849 points with the number of the documents being 9. The average score is approximately 94 points. The sum of the scores of the "semiconductor" cluster is 757 with the number of the documents being 7. The average score is approximately 108 points. The sum of the "electronic" cluster is 349 with the number of the documents being 4. The average score is approximately 87 points.

The average score thus calculated is referred to as the score of each cluster (the cluster score). The clusters are thus arranged in the order of magnitude of the score cluster from a high cluster score to a low cluster score.

Specifically, the highest cluster score is 108 points of the semiconductor cluster, the second highest cluster score is 94 points of the device cluster, and the third highest cluster score is 87 points of the electronic cluster, followed by the summary cluster (36 points), the specifications cluster (29 points), and the LP cluster (28 points) in that order.

The cluster score is calculated for each cluster, and the clusters are rearranged in the order of cluster score from a high score to a low score.

FIG. 13 lists the rearranged clustering results in a table. Referring to FIG. 13, the semiconductor cluster appears as the first group from the top of the table, the device cluster appears as the second group, and the electronic cluster appears as the third group, followed by the summary cluster, the specifications cluster, and the LP cluster in that order. In the clustering results shown in FIG. 13, a cluster containing a higher number of documents matching the keyword "semiconductor" input by the user comes at a higher order.

The clustering result shown in FIG. 13 is now compared with the clustering result shown in FIG. 11. In the clustering result shown in FIG. 11, the summary cluster, the LP cluster, and the specifications cluster likely to be formed of the documents not related to the keyword "semiconductor" input by the user, appears in a high order in the listing while the semiconductor cluster, the device cluster, and the electronic clusters likely contain documents directly related to the keyword appears in a low order in the listing. Referring to FIG. 13, such an arrangement order is reversed. The clusters likely to contain documents closely related to the keyword appears in a high order in the listing.

When there occurs a plurality of cluster scores, a cluster having a higher number of documents therewithin becomes higher in order than other clusters.

The sum and the average of the scores in each cluster may be displayed as shown in FIG. 13 or may not be displayed. As discussed above, the order of the cluster is determined based on the score assigned to each of the documents in the cluster rather than by simply sequencing the clusters with the number of documents contained therewithin (the number of the documents collected in the cluster). The cluster order compatible with the keyword is thus obtained.

The clustering result is presented to the user as shown in FIG. 13. The user views the table of the clustering results, and clicks the title portion of a document which is likely to contain information desired by the user. A displaying process is performed to display the body of the document corresponding to the title.

As discussed above, in the second embodiment of the present invention, a number of documents searched according to the keyword input by the user is subjected to the clustering process based on the feature contained in the titles of these documents, and the scores of the documents belonging to each cluster are then averaged on a cluster by cluster basis. The average score is treated as a cluster score. The cluster order is thus rearranged based on the cluster scores. Specifically, the clusters are sequenced in the order of cluster score from a high score to a low score. The clustering result is thus obtained as shown in FIG. 13.

Since the cluster likely to contain information desired by the user is positioned on the top of the table, the user can search desired information with ease.

In the above discussion, the clustering process is performed on the search result provided by a single general-purpose search service. This embodiment is applicable to the case in which the clustering process is performed on the search result provided by a plurality of search services.

The search services have their own specialty fields. For example, one search service has a large storage of sports-related information, another search service stores a great deal of academic field information, and another search service stores a vast amount of show-business related information. The search services stores abundant information in their own specialty fields, and each user has a good chance of retrieving his desired information therefrom. In information searching, it is a widely accepted practice to selectively use the search services in view of search purposes.

When a plurality of search services is used, the content, the size, and the output order of the search results provided by the search services are varied. For this reason, the apparatus includes, correspondingly to the plurality of search services, converter modules 102 for converting the files from the search services into a format that can be handled by the clustering module 103. When the cluster order is rearranged in the clustering result, a process of determining the cluster score is performed correspondingly to each search service.

For example, the cluster order rearrangement process of this embodiment requires several steps depending on the search service. When the width of score distribution is extremely wide (for example, the score ranges from a minimum of 2 to a maximum of 1000), the logarithm of each score may be taken. When a document has an excessively small score (for example, one document has a score of 2 or 3 while almost all other documents have scores on the order of several hundreds), that document is excluded from the clustering process.

With the ability to work with a plurality of search services, the user selects the search service depending on the field of desired information. The selective use of the plurality of search services in this way allows information searching to be performed in view of the advantage of the respective search service. The selective use of the plurality of search services also allows the search services to be switched from one to another in a flexible manner when the one search service is busy.

The second embodiment of the present invention is not limited to the above discussion, and various modifications are possible within the scope of this embodiment. In the discussion of this embodiment, a simple arithmetic average of the scores of the documents contained in each cluster is used for the cluster score. The maximum score among the scores of the documents in each cluster may be used as the cluster score. Alternatively, the score of a document at a midway point of the score distribution of the documents may be used as the cluster score.

The use of the maximum score in each cluster eliminates the need for a summation and a division in the determining of the cluster order, thereby reducing the amount of calculation. Even if there is a small number of documents having extremely small scores in the same cluster, the influence of such small scores is controlled. In the same manner as with the maximum score, the use of the median score in each cluster reduces the amount of calculation. Further, when the median score is used, the influence of extremely high scores and extremely low scores is controlled.

In the above discussion of the present embodiment, the title of the searched document is used as the cluster-indexing information (the information to be clustered). Besides the document title, the cluster-indexing information may be one of a URL address (excluding http://), an update date (a simple time or date/hour/time within the latest one month), and a file size (a byte size of the body of a Web page). These may be used solely or in combination. By selecting the cluster-indexing information, the apparatus performs clustering in a manner characteristic of the selected cluster-indexing information. What cluster-indexing information to select may be arranged as selection items from which the user initially selects in a menu. If any selected item is not present, another item may be used. For example, when a title is selected but no title is available on a corresponding Web page, a URL address may be used.

THIRD EMBODIMENT

A third embodiment of the information categorizing apparatus of the present invention is now discussed.

When the number of clusters obtained through clustering is not so large in the information categorizing process, learning all clustering results does not take much user's time.

The number of clusters obtained through the clustering process becomes occasionally large up to several tens to several hundreds. In such a case, even merely viewing all clustering results requires a great deal of attention.

In the third embodiment of the present invention, the clustering process is performed on the search result provided by a general-purpose search service, and a table for allowing the user to glance at the summary of the clustering results obtained through the clustering process is formed. In this way, the user can efficiently search for his desired information.

The third embodiment is now discussed in detail.

Figure 14:
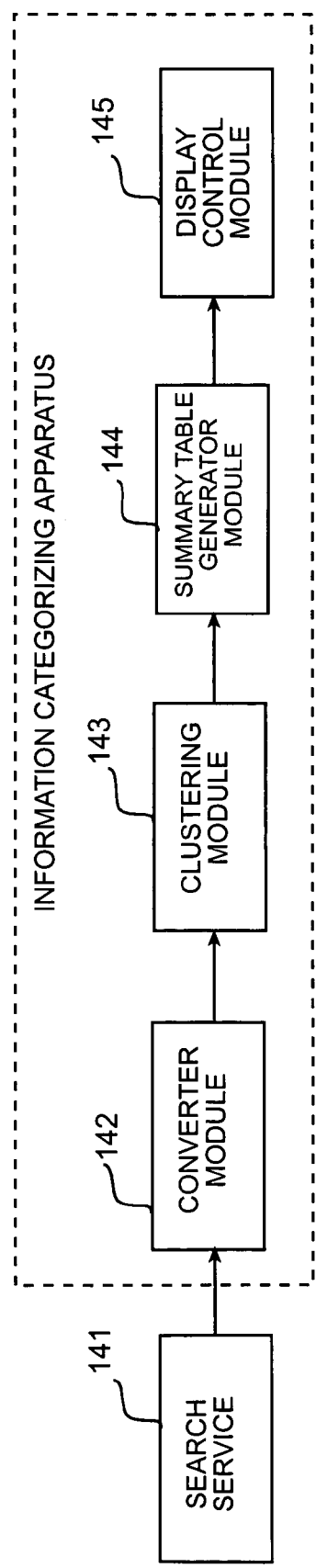
FIG. 14 shows the construction of a third embodiment of the present invention.

FIG. 14 diagrammatically shows the third embodiment of the present invention. Referring to FIG. 14, there are shown a search service 141, a converter module 142, a clustering module 143, a clustering result summary table generator module (hereinafter referred to as a summary table generator module) 144, and a display control module 145. The converter module 142, the clustering module 143, the summary table generator module 144, and the display control module 145 in combination correspond to the information categorizing apparatus. In particular, the third embodiment is characterized by the summary table generator module 144.

The search service 141 is a widely available one such as the Internet. When a user inputs a keyword as a search request, information searching is performed on Web pages, for example, in response to the input keyword. A search result provided by the search service 141 is output in a file form, and is transferred to the clustering module 143. There is typically available a plurality of search services 141, and output data formats become different from search service to search service. The converter module 142 is arranged to convert the file into a form that allows the file to be read regardless of whatever different search services might be employed.

The clustering module 143 performs the clustering process to the search result provided by the search service 141 (the file content converted by the converter module 142). In this embodiment, a title is extracted from a document, a word characteristic of and contained in the title is extracted as a feature, and the extracted feature is subjected to the clustering process.

Specifically, a portion extracted as the title of the document is subjected to morphological analysis, and a characteristic word is extracted from the morphological analysis result as the feature. A feature table indicating the relationship between the feature and the document associated with the feature is generated. For example, the feature table associates the feature with the document corresponding thereto, thereby listing the number of features contained in the title of each document. For example, features such as "summary", "LP", "specifications", "device", "semiconductor", and "electronic" are extracted from documents. The feature table lists the number of each feature contained in the title of each document.

A plurality of documents is now grouped into a plurality of clusters, each having semantic similarity, based on the feature table. Specifically, based on the feature contained in the title of each document, documents having the feature in common are grouped as one set, i.e., one cluster.

The clustering result discussed in connection with the second embodiment and shown in FIG. 11 is now output by the clustering module 143. Referring to FIG. 11, there is shown a table listing, as already discussed, the name of each cluster obtained through the clustering process (the cluster name here corresponds to the above-referenced feature), the title of each document belonging to the cluster, the number of documents contained in the cluster, and a number indicating a score of each title.

The score is used as an objective measure indicating the degree of match between the input keyword and each document. The larger the score, the higher the degree of match of the document to the keyword.

Referring to FIG. 11, the clustering results provided by the clustering module 143 are arranged in the order of the count of documents contained in the cluster. As already discussed, the summary cluster, the LP cluster, the specifications cluster, the device cluster, the semiconductor cluster, and the electronic cluster are arranged in the order from the top to the bottom of the table.

The summary table generator module 144 generates a clustering result summary table of the clustering result provided by the clustering module 143 (a summary table).

The display control module 145 performs display control, thereby presenting the clustering result provided by the clustering module 143 and the summary table provided by the summary table generator module 144. In this embodiment, in addition to the displaying of the clustering result and the summary table, the display control module 145 performs display control to present a mutually linked portion between the clustering result and the summary table and to present a cluster of concern to the user in a visibly distinct fashion. The display control will be specifically described later.

Figure 15:
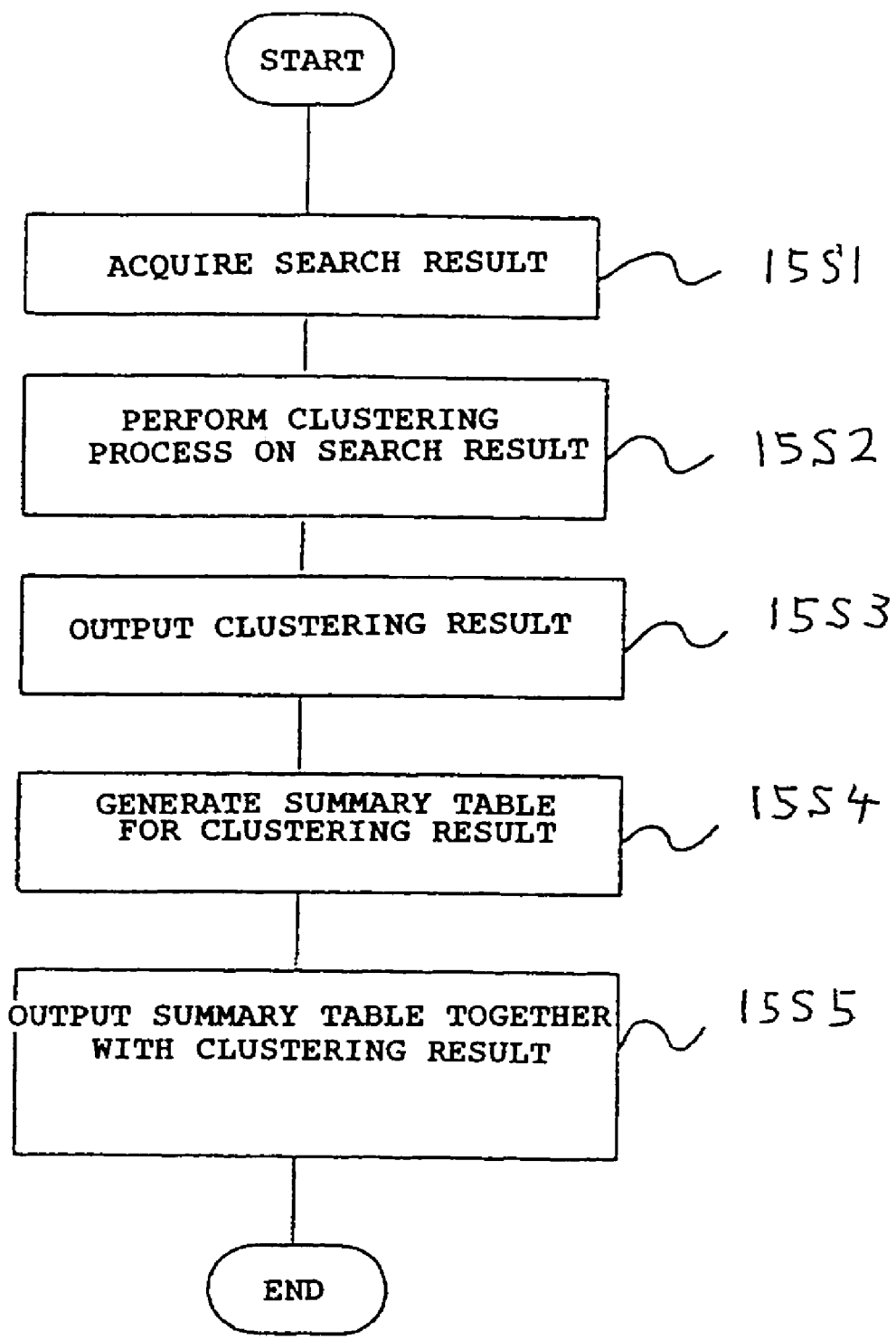
FIG. 15 is a flow diagram diagrammatically showing information categorizing process steps in accordance with the third embodiment of the present invention.

The information categorizing process in the third embodiment thus constructed of the present invention is discussed. FIG. 15 diagrammatically shows a flow diagram of the information categorizing process steps of this embodiment. A search result searched by the search service 1 is acquired (step 15S1), the clustering process is performed on the acquired search result (step 15S2), and the clustering result is output (step 15S3). A step of generating a summary table is performed based on the clustering result (step 15S4), and the generated summary table is displayed together with the above-mentioned clustering result (step 15S5). To display the generated summary table together with the above-mentioned clustering result, the summary table may be superimposed on the clustering result on a screen. Alternatively, the summary table and the clustering result are separately arranged so that the display unit displays the summary table followed by the clustering result. When the clustering result is large in volume, the user may scroll through the clustering result to successively see it.

In this embodiment, the clustering process performed by the clustering module 143 extracts the title of each document from the documents searched by the search service 141, extracts the features from the titles, generates the feature table indicating the relationship between the extracted features and the documents corresponding to the extracted features, and groups the documents into a plurality of clusters according to semantic similarity based on the content of the feature table. In this embodiment, for example, the user inputs the keyword "semiconductor" to the search service 141 as a search request, and the clustering module 143 clusters a number of obtained documents in response. FIG. 11 shows the clustering result.

The clustering result, provided by the clustering module 143, is input to the summary table generator module 144 for the following process.

A summary table based on cluster names (such as "summary", "LP", "specifications", "device", "semiconductor", and "electronic") is generated for the clusters (the summary cluster, the LP cluster, the specifications cluster, the device cluster, the semiconductor cluster, and the electronic cluster) in the clustering result shown in FIG. 11. The summary table is thus presented together with the clustering result.

FIG. 16 shows a display example in which the summary table 1610 is presented together with the clustering result 1620. In the display example, the summary table 1610 is followed by the clustering result 1620. The number of clusters of the clustering result 1620 is as small as six. In practice, however, the number of clusters may be as many as several tens to several hundreds. To search for desired information, the user must view all clustering results. If all clustering results are merely presented, the user must perform a tedious job to find desired information. Glancing at the cluster names of the summary table, the user comes to grips with what cluster is contained in the clustering results, and which cluster possibly includes information desired by the user.

The cluster names forming the summary table 1610 are respectively linked to the clustering results. Even when the clusters are too many for the clustering results to be displayed in one screen, the user simply clicks any desired cluster name in the summary table 1610 shown in FIG. 11, and the cluster portion, corresponding the desired cluster name, in the clustering result 1620 is immediately displayed. If the cluster name in the clustering results is clicked in this state, the display control will immediately return the screen back to the summary table.

The following functions are added to further promote ease of use of the apparatus in the display control.

The arrangement order of the cluster names in the summary table agrees with the arrangement order of the clusters in the clustering results. In the clustering results shown in FIG. 11, the arrangement order of the clusters in the clustering result are determined by the number of documents. For example, the number of documents in the summary cluster is 16, the number of documents in the LP cluster is 16, the number of documents in the specifications cluster is 14, the number of documents in the device cluster is 9, the number of documents in the semiconductor cluster is 7, and the number of documents in the electronic cluster is 4. Accordingly in the summary table, "summary", "LP", "specifications", "device", "semiconductor", and "electronic" are arranged from the left to the right as shown in FIG. 11.

The clusters in the clustering results may be sequenced in order with the cluster scores, rather than with the number of documents. As already discussed, the clustering results shown in FIG. 11 lists the titles of the documents, the number of documents in each cluster, and the score of each cluster in a table form.

The score is a value assigned to each document when a search service has searched for information according to the search service's own method in response to an input keyword. The score is typically used as an objective measure indicating the degree of match between the input keyword and the document corresponding thereto. The search results provided by a general-purpose search service are typically associated with respective scores.

Although the ways of calculating scores and the concepts behind the scores are different from search method to search method, it can be generally said that the larger the score, the more the document matches the keyword.

It is therefore contemplated that the scores in each cluster are averaged on a cluster by cluster basis to arrange the clusters in the order of scores from a high score to a low score. When the clusters are arranged in the order of average scores from a high score to a low score in the clustering results, the cluster names in the generated summary table are also arranged in that cluster order.

The average score of the summary cluster is approximately 36 points. (Since the score indicates the degree of match of the document to the keyword, the unit of score becomes different depending on the search service, for example in % or points. In this embodiment, the score is expressed in points.) The average score of the LP cluster is approximately 28 points. The average score of the specifications cluster is approximately 29 points. The average score of the device cluster is approximately 94 points. The average score of the semiconductor cluster is approximately 108 points. The average score of the electronic cluster is approximately 86 points. The average scores thus calculated are the scores of the respective clusters (called the cluster scores). Specifically, the highest cluster score is 108 points of the semiconductor cluster, the second highest cluster score is 94 points of the device cluster, and the third highest cluster score is 87 points of the electronic cluster, followed by the summary cluster (36 points), the specifications cluster (29 points), and the LP cluster (28 points) in that order.

When the clusters in the clustering results are rearranged in the order of cluster scores from a high score to a low score, the order of the cluster names in the summary table is also in the order of "semiconductor", "device", "summary", "specifications", and "LP".

The sum and the average of the scores in each cluster may be displayed as shown in FIG. 16 or may not be displayed.

Since the cluster order in the clustering results typically has some meaning, the order of the cluster names in the summary table is preferably set to agree with the cluster order in the clustering results. This arrangement advantageously helps the user search for desired information. The user typically views listed information from the top to the bottom on a screen. The user's purpose of finding desired information will be advantageously served if the arrangement order of the cluster names in the summary table agrees with the arrangement order of the clusters in the clustering results.

When a cluster name in the summary table 1610 is clicked to display the cluster portion of the clustering result 1620 linked thereto, the outline that encloses the cluster (referred to as a cluster outline) is displayed with the top portion thereof appearing on a first line on a screen. If the cluster is displayed with the cluster name appearing on the first line on the screen, the cluster feature corresponding to the cluster name (the document titles contained in the cluster in FIG. 11) can be disadvantageously unshown on the screen. Specifically, when the "semiconductor" is clicked in the summary table 1610 with the semiconductor cluster in the clustering result 1620 not appearing, the display shifts to the semiconductor cluster portion of the clustering result 1620 immediately in succession to the clicking operation. Then, the cluster feature at the top line of the cluster (the document title called "157 SEMICONDUCTOR DIVISION ENVIRONMENTAL GUIDE LINE" occasionally remains unshown.

To avoid such a problem, the cluster outline is displayed with the top portion of the cluster outline appearing on the first line on the screen. The cluster feature on the top of the cluster outline is thus presented with certitude.

To assure more certitude, the last line of a cluster immediately prior to the cluster of interest may be displayed on the first line on the screen. Specifically, when the cluster name "semiconductor" in the summary table 1610 is clicked in the above example, the semiconductor cluster in the clustering results will be displayed. In this case, the cluster feature on the last line in the device cluster immediately prior to the semiconductor cluster ("56 DEVICE-SEMI-CONDUCTOR-ASSP" in FIG. 11) may be displayed on the first line on the screen. With the cluster feature on the last line in the cluster immediately prior to the cluster of interest displayed on the first line on the screen, the cluster features in the cluster of interest are displayed with certitude.

The cluster names displayed in the summary table 1610 may be presented in different sizes and different colors depending on the cluster content in the clustering result 1620. The cluster content of the clustering result specifically indicates the degree of importance of each specific cluster, such as the degree of match of the document to the keyword input by the user. The degree of importance of the cluster is determined by the number of documents contained in each cluster or the score of each cluster. As already discussed, the average of the scores in each cluster is calculated, and a cluster having the maximum average score has the highest degree of importance. The displaying manner of that cluster having the highest degree of importance is made different from that for the remaining cluster names in the summary table 1610.

In the above example, the semiconductor cluster, from among the clustering results shown in FIG. 11, has the highest cluster score, the displaying manner of the cluster name "semiconductor" in the summary table, corresponding to the semiconductor cluster, is made different from the remaining cluster names. Specifically, the cluster name "semiconductor" may be displayed in a color different from that of the remaining cluster names in one embodiment. The outline enclosing the cluster name "semiconductor" may be made solider than the remaining outlines in another embodiment. The area enclosed by the outline of the cluster name "semiconductor" is set to be larger than the areas of the other cluster names in yet another embodiment. The cluster name "semiconductor" may be blinked in still another embodiment. The cluster name "semiconductor" is thus presented to the user in a visibly distinct way.

Similarly, a cluster having a larger number of documents may be presented to the user in a visibly distinct way. A cluster having a higher score may be presented in a color different from that of the remaining clusters. A cluster having a larger number of documents may be presented with the area of the outline thereof expanded. In this way, the clusters may be displayed with the displaying manner thereof changed depending on the cluster characteristics. Glancing at the summary table 1610, the user quickly learns characteristics shared by the clusters in common.

The summary table 1610 is presented with the cluster name containing the keyword input by the user presented in a manner different from that for the other cluster names to notify the user of this.

For example, the keyword input by the user is "semiconductor" in the clustering result shown in FIG. 11. Among the clusters in the clustering results, the semiconductor cluster is the very cluster containing the keyword.

In the summary table 1610 derived from the clustering results 1620, the "semiconductor" portion is displayed in a manner different from that of the other portions. For example, the "semiconductor" portion may be blinked, differently colored, or both blinked and differently colored to catch the eye of the user. Typically, the user wants to find a cluster name identical to the keyword input the user. An arrangement may be made so that the user learns at a glance the cluster name identical to the keyword in the summary table 1610. Such an arrangement is convenient to the user in the finding of information desired by the user.

When a cluster name is clicked referring to the display content with a portion of the clustering result 1620 presented on the screen, the display returns back to the summary table 1610. In this case, the summary table 1610 is preferably displayed with the head portion thereof appearing first on the screen.

Although the summary table 1610 is displayed with the clustering results presented in a simple format, the size thereof can become very large. There can be times when a plurality of summary tables are generated. In the discussion until now, the title of each document is used, the clustering process is performed on the titles, and the summary table is generated based on the clustering result obtained through the clustering process. The clustering process may be performed not only on the titles but also URL addresses (excluding http://).

For example, using the URL addresses, the clustering process can be performed on a number of documents, which have been used to obtain the clustering results shown in FIG. 11, and the summary table can be generated on the clustering results.

FIG. 17 shows a clustering result 1730 which has been obtained by performing the clustering process on the same documents shown in FIG. 11 according to the URL addresses, and a summary table 1740 generated based on the clustering result 1730. The cluster names obtained through the clustering process are URL addresses, including "www.epson.co.jp", "www.i-love-epson.ne.jp", and "other URL". The cluster names forming the summary table 1740 are URL addresses including "www.epson.co.jp", "www.i-love-epson.ne.jp", and "other URL".

As discussed above, the clustering process can be performed in a variety of methods, and a plurality of summary tables is thus obtained in response to the clustering results.

In this way, a plurality of summary tables is generated, or a single summary table having a high volume of data is generated. When the cluster name portion of the summary table is called with the clustering results being viewed on the screen, the head portion of a first one of the plurality of summary tables is displayed on a first line of the screen if the plurality of summary tables is generated. If the single large summary table is generated, the head portion of the summary table is displayed on the first line of the screen.

For example, the above arrangement works in the situation where the user wants to return to the summary table to see the summary of the clustering result subsequent to viewing the clustering result. When the display shifts back to the cluster name in the summary table in this case, the user can be at a loss of which portion of the summary table is currently presented if a plurality of summary tables or a single summary table with a vast amount of data loaded is presented. With this arrangement, however, the user views the entire summary table with the summary table displayed with the head portion thereof appearing on the first on the screen.

With a variety of functions added in this way as described above, the usefulness of the summary table is even more enhanced.

In this embodiment, as discussed above, a vast amount of information is clustered, and the clustering results are displayed together with the summary table containing the summary of the clustering result in a manner that allows the user to see the clustering result at a glance. Even the clustering results become a vast amount of information, the user still can view all clustering results. This arrangement substantially helps the user to find his desired information. With the variety of functions implemented in the summary table and the clustering results, the user can view which cluster has the highest degree of importance in response to the keyword input by the user. When shifting from the summary table to the clustering results, or returning from the clustering results to the summary table, the head portion of each content is displayed at a proper location on the screen. Even when the clustering results are alternated with the summary table on the screen, the user enjoys an efficient and comfortable operation, free from partly hidden displaying of information or free from being at a loss where the information of interest to the user is.

This embodiment is not limited to the above discussion, and various modifications are possible within the scope of this embodiment. For example, in the above-referenced embodiment, the cluster-indexing information (the information to be clustered) is the title of the searched document. The clustering process is performed using URL addresses (excluding http://), besides the titles.

The clustering process also may be performed using an update date (a simple time or date/hour/time within the latest one month), and a file size (a byte size of the body of a Web page). These may be used solely or in combination. By selecting the cluster-indexing information, the apparatus performs clustering in a manner characteristic of the selected cluster-indexing information. The summary table is generated based on the respective clustering results.

In the above discussion, search results provided by a single general-purpose search service are subjected to the clustering process. The present invention is applicable to the case in which the search results provided by a plurality of search results are subjected to the clustering process. The clustering process is performed to the individual search results by the search services, and the clustering results are used to generate the summary table.

In this embodiment, as described above, the plurality of searched documents are subjected to the clustering process, the summary table for allowing the user to glance at the summary of the clustering results obtained through the clustering process is formed, and the summary table is displayed together with the clustering results. Even the clustering results become a vast amount of information, the user still can roughly come to grips with the content of all clustering results. This arrangement substantially helps the user to find his desired information. Since the user can roughly come to grips with the content of all clustering results, the user can find not only information desired by the user in an efficient manner but also unexpected information. The user can thus learn new information with ease.

By mutually linking the clustering results to the clustering result summary table, the user can easily shift from the clustering result summary screen to the corresponding cluster portion of the clustering results. The user can also return back to the summary table. Even if the clustering results have a vast amount data, the user reaches a cluster that is likely to contains desired information by repeating an alternation process therebetween. The user can thus find information desired by the user in an efficient manner.

In the displaying of the clustering result summary table, the displaying manner of the cluster name in the summary table may be made different depending on the degree of importance. The displaying manner of the cluster containing the keyword input by the user may be made different from the other clusters. In this way, the user can quickly estimate where to locate the desired information by glancing at the clustering result summary table. The user can thus efficiently find his desired information.

The invention claimed is:

1. An information categorizing method comprising:
   a step of acquiring, through a clustering module, a plurality of search results searched by a search service,
   a step of performing, through the clustering module, a clustering process on the search results that categorizes the search results into a clustering result that comprises a plurality of clusters, each cluster having an identifier and all search results assigned to that cluster by the clustering process, the identifiers being presented in a non-hierarchical arrangement,
   a step of generating a non-hierarchical clustering result summary table representing a summary of the clustering result, the non-hierarchical clustering result summary table containing no search results, and
   a step of outputting the non-hierarchical summary table together with the clustering result such that all of the search results are displayed, each search result being displayed in one or more of the clusters,
   wherein neither the clustering process performing step nor the clustering result is based on any predefined categories and wherein the summary table and the clustering result are distinct.

2. An information categorizing method according to claim 1, further comprising a step of converting, through a converter module, the search result searched by the search service into a format that is processed by the clustering module.

3. An information categorizing method according to claim 2, wherein the converter module is arranged correspondingly to each of a plurality of search services when the clustering process is performed correspondingly to the plurality of search services.

4. An information categorizing method according to claim 3, wherein a search process is performed using one search service selected from the plurality of search services and the clustering process is performed on the search result searched by the selected search service.

5. An information categorizing method according to claim 3, wherein search processes are performed in parallel using at least two search services of the plurality of search services, respective search results are collected, and the clustering process is performed on the collected search results.

6. An information categorizing method according to claim 3, wherein search processes are performed in parallel using at least two search services of the plurality of search services, and the clustering process is individually performed on the search results.

7. An information categorizing method according to claim 1, wherein when the clustering process is performed on the search result, information to be clustered is at least one of the title of a document, a URL address, an update date, and a file size of an individual search result.

8. An information categorizing method according to claim 1, wherein the order of the clustering result is rearranged using a score indicating the degree of match between the clustering result and a search request for each document and the clustering result with the order thereof rearranged is then output.

9. An information categorizing method according to claim 8, wherein the rearranging process of the cluster order comprises a step of calculating the average of scores of the documents contained in each cluster to treat the average of each cluster as a cluster score, and a step of rearranging the cluster order using the cluster scores.

10. An information categorizing method according to claim 8, wherein the rearranging process of the cluster order comprises a step of determining the maximum value of the scores of the documents in each cluster to treat the maximum score of each cluster as the cluster score, and a step of rearranging the cluster order using the cluster scores.

11. An information categorizing method according to claim 8, wherein the rearranging process of the cluster order comprises a step of determining a score at a midway point or a substantially midway point in each cluster when the documents contained in each cluster are arranged in the order of magnitude of scores assigned thereto, to treat the score at the midway point or the substantially midway point as the cluster score, and a step of rearranging the cluster order using the cluster scores.

12. An information categorizing method according to claim 9, wherein the cluster score determining step for rearranging the cluster order is individually performed correspondingly to the plurality of search services when the clustering process is performed correspondingly to the search results provided by the plurality of search services.

13. An information categorizing method according to claim 7, wherein the clustering process is performed based on a feature, and wherein the title of each document is detected and a word characteristic of and contained in the title is extracted as the feature.

14. An information categorizing method according to claim 8, wherein the manner of outputting the clustering result with the cluster order rearranged comprises displaying the clusters in the order of the magnitude of scores from a high score to a low score and wherein when there are clusters having the same cluster score, one of the clusters having a larger number of documents therewithin is positioned higher in the cluster order.

15. An information categorizing method according to claim 1, wherein the clustering result summary table includes a cluster name of each cluster which is obtained through the clustering process.

16. An information categorizing method according to claim 15, wherein the clustering result is mutually linked with the clustering result summary table, wherein when a cluster name portion of the clustering result summary table is designated, the corresponding cluster portion of the clustering result is displayed, and wherein when one cluster portion of a clustering result is designated, the clustering result summary table is displayed.

17. An information categorizing method according to claim 16, wherein when a cluster name portion of the clustering result summary table is designated to display the corresponding cluster portion of the clustering result, the head portion of an outline surrounding the cluster or the last line in the outline of the cluster present immediately prior to the first cluster is displayed on the top of a screen.

18. An information categorizing method according to claim 17, wherein when the one cluster portion of the clustering result is designated to display the clustering result summary table, the clustering result summary table is displayed with the head portion thereof appearing first on the screen.

19. An information categorizing method according to claim 15, wherein the arrangement order of clusters forming the clustering result summary table agrees with the arrangement order of the clusters in the clustering result.

20. An information categorizing method according to claim 15, wherein when the clustering result summary table is displayed, the manner of displaying the cluster names is changed in the clustering result summary table depending on the importance of each cluster in response to the clustering result.

21. An information categorizing method according to claim 15, wherein when a plurality of documents to be clustered are the ones which have been searched using a keyword input by a user, the manner of displaying the cluster names containing the keyword input by the user is different in the clustering result summary table from the other cluster names.

22. An information categorizing apparatus comprising:
a clustering module for acquiring a plurality of search results searched by a search service, performing a clustering process on the search results that categorizes the search results into a clustering result that comprises a plurality of clusters, each cluster having an identifier and all search results assigned to that cluster by the clustering process, the identifiers being presented in a non-hierarchical arrangement,
a summary table generator module for generating a non-hierarchical clustering result summary table representing a summary of the clustering result, the non-hierarchical clustering result summary table containing no search results, and
a display control unit for outputting the non-hierarchical summary table together with the clustering result such that all of the search results are displayed, each search result being displayed in one or more of the clusters,
wherein neither the clustering process nor the clustering result is based on any predefined categories and wherein the summary table and the clustering result are distinct.

23. An information categorizing apparatus according to claim 22, further comprising a converter module for converting the search result searched by the search service into a format that is processed by the clustering module.

24. An information categorizing apparatus according to claim 22, further comprising a cluster order setting module which rearranges the order of the clustering result using a score indicating the degree of match between the clustering result and a search request for each document and outputs the clustering result with the order thereof rearranged.

25. A storage medium storing an information categorizing software program in which a clustering module performs a clustering process on a plurality of search results that have been searched by a search service in response to a search request of a user, and outputs the clustering result, the information categorizing software program comprising:
a step of acquiring the search result from the search service,
a step of performing the clustering process on the acquired search result that categorizes the search results into a clustering result that comprises a plurality of clusters, each cluster having an identifier and all search results assigned to that cluster by the clustering process, the identifiers being presented in a non-hierarchical arrangement,
a step of generating a non-hierarchical clustering result summary table representing a summary of the clustering result, the non-hierarchical clustering result summary table containing no search results, and and a step of outputting the summary table together with the clustering result such that all of the search results are displayed, each search result being displayed in one or more of the clusters, wherein neither the clustering process performing step nor the clustering result is based on any predefined categories and wherein the summary table and the clustering result are distinct.

26. A storage medium storing an information categorizing software program according to claim 25, wherein the step of performing the clustering process is performed subsequent to a step of converting the search result searched by the search service into a format that is processed by the clustering module.

27. A storage medium storing an information categorizing software program according to claim 25, comprising a step of rearranging the order of the clustering result using a score indicating the degree of match between the clustering result and a search request for each document and a step of outputting the clustering result with the order thereof rearranged.

28. A method for categorizing digital information, comprising the steps of:

acquiring at least one group of a plurality of digital items from at least one search of a database or network;

extracting from each item in at least one group of a plurality of digital items selected cluster-indexing information comprising at least one of title, URL address, update date, and file size;

clustering the plurality of digital items in at least one group according to each of the selected cluster-indexing information into a clustering result that comprises a plurality of clusters, each cluster having an identifier and the selected cluster-indexing information of all the search-acquired items assigned to that cluster, the identifiers being presented in a non-hierarchical arrangement;

generating a non-hierarchical clustering result summary table representing a summary of the clustering result, the non-hierarchical clustering result summary table containing no search results; and outputting the clustering result together with the summary table such that the selected cluster-indexing information of all of the search-acquired items are displayed, each selected cluster-indexing information being displayed in one or more of the clusters, wherein neither the clustering nor the cluster result is based on any predefined categories and wherein the summary table and the clustering result are distinct.

29. The method according to claim 28, further comprising converting each of the acquired digital items into a common format before performing the clustering.

30. The method according to claim 28, wherein the at least one group of a plurality of digital items is acquired by selecting only one such group from a plurality of groups, each group being the result of an independent search, and wherein the clustering is performed on the selected one group.

31. The method according to claim 28, wherein the at least one group of a plurality of digital items acquired comprises a plurality of such groups, each group being the result of an independent search performed in parallel with one another, and wherein the clustering is performed on the collective search results.

32. The method according to claim 28, wherein the at least one group of a plurality of digital items acquired comprises a plurality of such groups, each group being the result of an independent search performed in parallel with one another, and wherein the clustering is individually performed on the search results.

33. The method according to claim 28, wherein, when a plurality of clusters are formed, the clustering comprises rearranging the order of the clusters based on individual cluster scores, each of which indicates the degree of match between the digital items in that cluster and a corresponding search query, and wherein the outputting comprises outputting the clusters in their rearranged order.

34. The method according to claim 33, wherein the rearranging comprises calculating a value for each digital item in each cluster indicating the degree of match between that item and the corresponding search query, and calculating for each cluster the average of the values of each digital item in that cluster to generate the score for that cluster, and rearranging the cluster order using the cluster scores.

35. The method according to claim 33, wherein the rearranging comprises calculating a value for each digital item in each cluster indicating the degree of match between that item and the corresponding search query, determining the maximum value in each cluster, assigning the maximum value of each cluster as the score for that cluster, and rearranging the cluster order using the cluster scores.

36. The method according to claim 33, wherein the rearranging comprises calculating a value for each digital item in each cluster indicating the degree of match between that item and the corresponding search query, determining the middle or substantially middle value in magnitude in each cluster, assigning the middle or substantially middle value in each cluster as the score for that cluster, and rearranging the cluster order using the cluster scores.

37. The method according to claim 33, wherein the at least one group of a plurality of digital items acquired comprises a plurality of such groups, each group being the result of an independent search performed in parallel with one another, and wherein the clustering and the rearranging of cluster order is individually performed on the search results.

38. The method according to claim 28, wherein the title of each digital item in at least one group of a plurality of digital items is extracted, each title being defined by selected characters in the corresponding digital item, the selected characters being identified by one of location, size and a fixed number of words in from a designated beginning of the digital item, and wherein the identified selected characters are extracted and clustering is performed based on the selected characters extracted.

39. The method according to claim 33, wherein the outputting of the clusters in rearranged order comprises displaying the clusters in the order of score magnitude from a high score to a low score, with clusters having the same score being displayed in the order of item number from a larger number to a smaller number.

40. The method according to claim 28, wherein the clustering result summary table includes a cluster name of each cluster which is obtained through the clustering.

41. The method according to claim 40, wherein the cluster result is mutually linked with the clustering result summary table, wherein, when a cluster name portion of the clustering result summary table is designated, the corresponding portion of the cluster result is displayed, and wherein when one portion of a cluster result is designated, the clustering result summary table is displayed.

42. The method according to claim 28, wherein when the clustering result summary table is displayed, the manner of displaying the cluster names in the clustering result summary table is based on the importance of each cluster in response to the cluster result.

43. An information categorizing apparatus comprising:
a clustering module configured to
acquire at least one group of a plurality of digital items from at least one search of a database or network,
extract from each item in at least one group of a plurality of digital items selected cluster-indexing information comprising at least one of title, URL address, update date, and file size,
cluster the plurality of digital items in at least one group according to each of the selected cluster-indexing information into a clustering result that comprises a plurality of clusters, each cluster having an identifier and the selected cluster-indexing information of all the search-acquired items assigned to that cluster, the identifiers being presented in a non-hierarchical arrangement,
a summary table generator module configured to
generate a non-hierarchical clustering result summary table that summarizes the clustering result, the non-hierarchical clustering result summary table containing no search results; and
a display control unit configured to
output the summary table together with the clustering result such that the selected cluster-indexing information of all of the search-acquired items are displayed, each selected cluster-indexing information being displayed in one or more of the clusters,
wherein neither the cluster operation nor the cluster result is based on any predefined categories and wherein the summary table and the clustering result are distinct.

44. An information categorizing apparatus according to claim 43, further comprising:
a converter module that converts each of the acquired digital items into a common format that is processed by the clustering module.

45. An information categorizing apparatus according to claim 43, further comprising:
a cluster order setting module configured to
rearranging, when a plurality of clusters are formed, the order of the clusters based on individual cluster scores, each of which indicates the degree of match between the digital items in that cluster and a corresponding search query, and
wherein the clustering module outputs the clusters in their rearranged order.

46. A computer-readable storage medium containing a program of instructions for categorizing digital information, the program of instructions comprising instructions for:
acquiring at least one group of a plurality of digital items from at least one search of a database or network;
extracting from each item in at least one group of a plurality of digital items selected cluster-indexing information comprising at least one of title, URL address, update date, and file size;
clustering the plurality of digital items in at least one group according to each of the selected cluster-indexing information into a clustering result that comprises a plurality of clusters, each cluster having an identifier and the selected cluster-indexing information of all the search-acquired items assigned to that cluster, the identifiers being presented in a non-hierarchical arrangement;
generating a non-hierarchical clustering result summary table representing a summary of the cluster result, the non-hierarchical clustering result summary table containing no search results; and
outputting the summary table together with the clustering result such that the selected cluster-indexing information of all of the search-acquired items are displayed, each selected cluster-indexing information being displayed in one or more of the clusters,
wherein neither the clustering nor the clustering result is based on any predefined categories and wherein the summary table and the clustering result are separate.

47. The computer-readable storage medium according to claim 46, further comprising converting each of the acquired digital items into a common format before performing the clustering.

48. The computer-readable storage medium according to claim 46, wherein the at least one group of a plurality of digital items is acquired by selecting only one such group from a plurality of groups, each group being the result of an independent search, and wherein the clustering is performed on the selected one group.

49. The computer-readable storage medium according to claim 46, wherein the at least one group of a plurality of digital items acquired comprises a plurality of such groups, each group being the result of an independent search performed in parallel with one another, and wherein the clustering is performed on the collective search results.

50. The computer-readable storage medium according to claim 46, wherein the at least one group of a plurality of digital items acquired comprises a plurality of such groups, each group being the result of an independent search performed in parallel with one another, and wherein the clustering is individually performed on the search results.

51. The computer-readable storage medium according to claim 46, wherein, when a plurality of clusters are formed, the clustering comprises rearranging the order of the clusters based on individual cluster scores, each of which indicates the degree of match between the digital items in that cluster and a corresponding search query, and wherein the outputting comprises outputting the clusters in their rearranged order.

52. The computer-readable storage medium according to claim 51, wherein the rearranging comprises calculating a value for each digital item in each cluster indicating the degree of match between that item and the corresponding search query, and calculating for each cluster the average of the values of each digital item in that cluster to generate the score for that cluster, and rearranging the cluster order using the cluster scores.

53. The computer-readable storage medium according to claim 51, wherein the rearranging comprises calculating a value for each digital item in each cluster indicating the degree of match between that item and the corresponding search query, determining the maximum value in each cluster, assigning the maximum value of each cluster as the score for that cluster, and rearranging the cluster order using the cluster scores.

54. The computer-readable storage medium according to claim 51, wherein the rearranging comprises calculating a value for each digital item in each cluster indicating the degree of match between that item and the corresponding search query, determining the middle or substantially middle value in magnitude in each cluster, assigning the middle or substantially middle value in each cluster as the score for that cluster, and rearranging the cluster order using the cluster scores.

55. The computer-readable storage medium according to claim 51, wherein the at least one group of a plurality of digital items acquired comprises a plurality of such groups, each group being the result of an independent search performed in parallel with one another, and wherein the clustering and the rearranging of cluster order is individually performed on the search results.

56. The computer-readable storage medium according to claim 46, wherein the title of each digital item in at least one group of a plurality of digital items is extracted, each title being defined by selected characters in the corresponding digital item, the selected characters being identified by one of location, size and a fixed number of words in from a designated beginning of the digital item, and wherein the identified selected characters are extracted and clustering is performed based on the selected characters extracted.

57. The computer-readable storage medium according to claim 51, wherein the outputting of the clusters in rearranged order comprises displaying the clusters in the order of score magnitude from a high score to a low score, with clusters having the same score being displayed in the order of item number from a larger number to a smaller number.

58. The computer-readable storage medium according to claim 46, wherein the clustering result summary table includes a cluster name of each cluster which is obtained through the clustering.

59. The computer-readable storage medium according to claim 58, wherein the cluster result is mutually linked with the clustering result summary table, wherein, when a cluster name portion of the clustering result summary table is designated, the corresponding portion of the cluster result is displayed, and wherein when one portion of a cluster result is designated, the clustering result summary table is displayed.

60. The computer-readable storage medium according to claim 46, wherein when the clustering result summary table is displayed, the manner of displaying the cluster names in the clustering result summary table is based on the importance of each cluster in response to the cluster result.

* * * * *